United States Patent

Nashljunas et al.

[15] 3,639,903

[45] Feb. 1, 1972

[54] METHOD OF AND AUTOMATIC SYSTEM FOR RECOGNITION OF OBJECTS BY THEIR CONTOUR REPRESENTATIONS

[72] Inventors: Rimantas Alfonso Nashljunas, Vilinjus, ul. L. Giros, 3, kv. 2; Romualdas Alberto Zhlabys, Vilinjus, ul. Eisukyavichus, 46, kv. 86; Kazimieras-Gediminas Kazimiero Buchjunas, Vilinjus, ul. Antakalnio, 105, kv. 18; Povilas Prantsishkaus Shvagzhdys, Vilinjus, ul. Eidukyavichus, 38, kv. 14, all of Vilnjus, U.S.S.R.

[22] Filed: Apr. 30, 1968

[21] Appl. No.: 725,316

[52] U.S. Cl. ........ 340/146.3AC
[51] Int. Cl. ........ G06k 9/10
[58] Field of Search ........ 340/146.3

[56] References Cited

UNITED STATES PATENTS

| | | | |
|---|---|---|---|
| 3,142,818 | 7/1964 | Holt | 340/146.3 |
| 3,293,604 | 12/1966 | Klein et al | 340/146.3 |
| 3,465,288 | 9/1969 | Silverman et al. | 340/146.3 |

*Primary Examiner*—Maynard R. Wilbur
*Assistant Examiner*—Leo H. Boudreau
*Attorney*—Waters, Roditi, Schwartz & Nissen

[57] ABSTRACT

A method and apparatus for recognizing objects by their contour representations being similar to the contour of a reference object. The method and apparatus includes dividing the contour representation into scanning lines, coding the lines into code line digits, determining the number of intersections of the background and contour in each line, determining transitions from lines with one number of intersections to lines with another number of intersections, automatically fixing lines at the places of transitions, dividing the contour representation by the fixed lines into sections, forming section codes of the sections from present digits of respective section line codes, detecting in the section line code being obtained code portions confined between the code digits corresponding to the intersections in at least one of the fixed lines defining the boundaries of the sections, determining closed-open contour characteristics of the contour portions between intersections in the fixed lines by the character of the code portions, and determining by the obtained closed-open contour characteristics of the contour portions whether the object being recognized belongs to one of the reference objects.

25 Claims, 19 Drawing Figures

METHOD OF AND AUTOMATIC SYSTEM FOR RECOGNITION OF OBJECTS BY THEIR CONTOUR REPRESENTATIONS

The present invention relates to a method of and an automatic system for recognition of objects by their contour representation and has specific utility in classifying graphic matter, for example, in reading alphanumerical information directly from original documents and further introducing the data into an electronic computer or in automatic transfer of information onto some other recording media, such as punched cards or tape, in analyzing complex curves representing technological and other processes, etc.

A method for recognizing objects by their contour representations is known, the method being based on coding their contour representation scanning lines and automatically fixing these lines in places of changeover from lines having one number of intersections with the contour to lines having another number of intersections.

This method uses only local information on objects being recognized and does not envisage a more detailed analysis of the object contour representation between places where changeover from one number of intersections to another takes place.

In addition, systems for object recognition by contour representations are known which employ units capable of analyzing of the object contour line in predetermined sections thereof.

The above-mentioned systems are disadvantageous in that recognition is effected with insufficient accuracy and only insignificant variations in the object configuration are allowed due to geometrical association of the contour with the analysis frame. Moreover, these methods and systems, due to a predetermined number of zones of obtaining the object characteristics, allow only a predetermined number of characteristics to be obtained, which sets limitations on learning and (or) self-learning of the systems when used for recognition of object classes that are not preassigned.

Strictly determined sets of characteristics and length of characteristic sequence for objects of various classes impose strict limitations on detection of serious contour distortions, the latter circumstance being of particular importance in forming recognition uncertainty signals, repetitive analysis signals, etc., in the recognition systems.

The latter shortcoming is to a great extent inherent in all the recognition methods and systems employing determined systems of characteristics.

Only recognition systems classifying object representations immediately in the field of the object representation elements do not feature the above-mentioned disadvantage, but these systems are impractical for recognizing objects in case of nonlinear distortion of their configuration, for example, in recognizing handwritten alphanumerical characters and a great number of various fonts of typewritten and printed symbols.

Some terms used in the specification of the present invention are explained for clarity.

"Contour representation" means the image of the object to be recognized. It consists of the background and the object contour line (or contour).

"Section of contour representation" means a part of contour representation. It also consists of the background and the contour line or of its portions.

"Contour portion" means a part of contour line being within a section of contour representation.

"Closed-open contour characteristics" are the characteristics of contour lines as well as of contour portions, but not of the contour representation or section of contour representation. A contour (or its portion) is closed if it is continuous between the points of its intersections with a scanning line whereas it is open if it is discontinuous between said intersection points.

"Line-type signal" means signal representative of scan line type. The types of scan lines are determined according to the number of their intersections with the contour.

"Line-type sequence" means the order in which scan line types appear when a contour representation is analyzed.

"Section code of contour representation" means the code obtained from coded scan lines confined in a specific section of contour representation.

It is an object of the present invention to provide a method of and a system for recognizing objects by their contour representations, which is capable of a more detailed analysis of the object contour representations.

It is another object of the present invention to provide for invariance of the obtained "closed-open contour" characteristics to contour shifts within the recognition frame and for a considerable stability of the characteristics to nonlinear configuration distortions of the objects being recognized.

It is still another object of the invention to provide a method and an automatic system which would enable obtaining of closed-open contour characteristics of the contour portions without tracing the contour and would make it possible to overcome difficulties arising from incidental discontinuities of the object contour and inherent in the contour tracing recognition systems.

It is one more object of the invention to provide an object recognition method employing such a set of characteristics, which would make it possible to develop an object recognition system utilizing learning (self-learning) principles.

It is a further object of the invention to provide a set of closed-open contour characteristics of contour portions, in which the length of the code sequence of said characteristics would vary in case of considerable contour distortions.

The latter fact enables a repetitive contour representation analysis, formation of a recognition uncertainty signal in the process of object classification by said system, etc. If several different sequences of the closed-open contour characteristics of the contour portions are representative of objects of the same class, the sequences can be employed as parallel in making up the reference description of the classes.

Irregularity of the obtained code sequence length of closed-open contour characteristics of the contour portions of different configuration objects makes it possible to employ a ternary coding of the characteristics, that is, to fix the closed-open contour characteristics of the contour portions in the appropriate code digit as well as the absence of a check on the contour for its being closed or open, which, in a number of cases, is conductive to increasing the distance between the codes being compared and, thereby, to increasing the reliability of recognition.

This object is attained, accordingly, in a method of recognizing objects by their contour representations based on coding the contour representation scanning lines and automatically detecting them in places of stable changeover from lines having one number of intersections with the contour to lines having another number of intersections, wherein, according to invention, in the process of detecting these lines or after the contour representation of the object is divided by the lines thus fixed into sections, whereafter section codes are formed from the preset code digits of the lines belonging to an appropriate section, code portions confined between the code digits corresponding to intersections of the contour with at least one of the fixed lines which determine the boundaries of the sections are derived from the obtained code of the section, the closed-open contour characteristics of the contour portions between the intersections in the fixed lines are determined by the character of the code of the portions, and the fact whether the object being recognized falls into one of the reference classes is determined by the obtained closed-open contour characteristics of the contour portions.

The closed-open contour characteristics of the contour portions of the reference objects can be preassigned for estimating whether the object being recognized belongs to some reference class of objects by comparing the obtained closed-open contour characteristics of the object being recognized with the characteristics of reference objects.

The obtained closed-open contour characteristics of the contour portions can be stored in the process of learning and adopted as reference closed-open contour characteristics.

For binary values of line-code digits it is preferable to form section code digits by means of logical summing of the contents of the specified digits of the line codes in the appropriate sections, whereas the closed-open contour characteristics of the contour portions defined by code portions are to be determined by the number of zero digits in the code portions of the logical sum by comparing them with the threshold number of zero digits.

In case of nonbinary digit values of the line codes the section-code digits can be obtained by means of integrating the contents of the line-code digits. The code thus obtained enables the estimation of closed-open contour characteristics of the contour portions. The result of integrating the contents of line-code digits can be transformed digit-by-digit into a binary code so as to enable the obtaining of closed-open contour characteristics of the contour portions in the way it was done with binary values of the line-code digits.

In obtaining the closed-open contour characteristics of the contour portions, it is preferable to carry out the line-by-line analysis of the contour representation in several directions.

In obtaining the closed-open contour characteristics of the contour portions, the length of the code sequence of these characteristics should be fixed.

The automatic system designed for recognizing objects by their contour representations comprises an object contour representation data readout unit and a logic means with a classifier connected therewith, the logic means, according to the invention, includes a unit for determining the number of intersections and for producing line-type signals, the unit being connected to the data readout unit and to a circuit for obtaining and storing the sequence of the line types with a command decoder, a unit for forming and storing the section codes of contour representation and intersection coordinates, incorporating circuits for controlling its elements, and coupled to the command decoder, a control signal decoder coupled to the command decoder and to the unit for forming and storing, the section codes of contour representation, a circuit for distributing section-codes of contour representation connected to the unit for forming and storing the codes of contour representation and to the command decoder, a circuit for obtaining the closed-open contour characteristics of the contour portions connected to the classifier, a circuit for section-code distribution, a command decoder and to the unit for forming and storing codes of contour representation.

The unit for forming and storing codes of contour representation and intersection coordinates can be made as a unit for forming logical sums and for obtaining the coordinates of intersections in the fixed lines.

The unit for determining the number of intersections and for producing line-type signals may include a circuit for detecting intersections with the preset criteria according to the number of unity digits in the codes of the contour representation lines, a circuit for detecting intervals between intersections in accordance with the number of zero digits between the unity digits in the line code, a flip-flop circuit whose inputs are connected to the above-mentioned circuits for detecting intersections and intervals, a counter connected to the flip-flop circuit and a circuit connected with the counter for determining the line types in accordance with the number of intersections in the lines being analyzed and their sequence. The intersection and interval detecting circuits employ AND and OR gates and are coupled to a reception register of the unit for forming and sorting the section codes of contour representation.

A circuit for obtaining and storing the sequence of line types may comprise storage elements in the form of flip-flop circuits and AND and OR gates interconnected so as to form, in accordance with the sequence of the line-type signals, at the output of the line-type determining circuit in the command decoder commands for controlling the unit for forming and storing the section codes of contour representation and intersection coordinates, the circuit for distributing section codes of contour representation and the circuit for obtaining the closed-open contour characteristics of the contour portions.

It is desirable that the unit for forming the logical sums and for obtaining the coordinates of intersections in the fixed lines be composed of a reception shift register, at least one register for intermediate storage of the line codes, at least one shift register for storing codes of the fixed lines and at least one shift register for forming logical sums, interconnected via AND and OR gates of circuits for controlling these registers, as well as of a circuit for fixing the intersection coordinates, the latter circuit being coupled to the shift registers for storing codes of the fixed lines, it is likewise preferable to connect the registers for storing codes of the fixed lines and registers for forming logical sums to the circuit for distributing section codes of contour representation.

The circuit for obtaining closed-open contour characteristics of the contour portions may comprise: open-contour criterion counters connected to the circuit for fixing intersection coordinates and to the circuit for distributing section codes of contour representation, a circuit for analyzing contour portions for their being open, the latter circuit employing AND and OR gates and flip-flop circuits for fixing the open-contour characteristic and connected to the open-contour criterion counter, and a circuit for distributing closed-open contour characteristics of the contour portions employing AND and OR gates and flip-flop circuits and coupled to the open-contour determining circuit.

It is preferable to insert switches between the open-contour criterion counter and the circuit for analyzing the contour portions for their being open for establishing an open-contour criterion of contour portions.

It is also preferable to provide the circuit for obtaining closed-open contour characteristics of the contour portions with at least one pair of counters for estimating the number of unit and zero digits in the logical sum code being analyzed for the presence of the closed-open contour characteristic with respect to the fixed line having two intersections, the inputs of the counters being connected to the circuit for section codes of contour representation, the outputs of the zero digit counter being connected to the circuit for analyzing the contour portions for their being open, the outputs of the unity digit counters being connected to the circuit for analyzing the contour portions for their being open, and the output of the unity digit counter being connected to the reset input of the other counter.

Between the zero digit counter and the circuit for analyzing the contour portions for their being open, provision is made for switches establishing the open-contour criteria.

For the repetitive analysis of the contour representation, if the closed-open contour characteristics obtained do not very closely agree with the reference ones, provision can be made in the automatic recognition system for a feedback coupling between the classifier output and the unit for determining the number of intersections and for producing line-type signals, thus making it possible to vary the criterion of obtaining intersections and intervals in the line codes.

For varying the criteria of obtaining open contour characteristics of contour portions, provision can also be made for a feedback coupling between the classifier output and the circuit for analyzing the contour portions for their being open.

For increasing the number of characteristics of the objects being recognized, it is preferable to connect the unit for determining the number of intersections and for producing line-type signals via the unit for analyzing the line-type signals with the classifier, supplied with the corresponding reference line-type characteristics.

To the output of the command decoder, it is preferable to connect circuits for measuring time intervals between the control commands, which are assumed to be the characteristics of the object being recognized, the outputs of these circuits being connected to the classifier which is supplied with reference characteristics corresponding to the time intervals.

To the unit for determining the number of intersections and for producing line-type signals, circuits for measuring time intervals between intersections can be connected; these time intervals are assumed to be the characteristics of the object being recognized. The outputs of these circuits are connected to the classifier supplied with the appropriate reference characteristics.

For a preliminary classification of objects being formed into subclasses defined by the presence of lines with a preset number of intersections, the command decoder should be connected to the classifier.

Other objects and advantages of the present invention will become clear from a consideration of exemplary embodiments thereof with due reference to the accompanying drawings, wherein.

Figure 1:
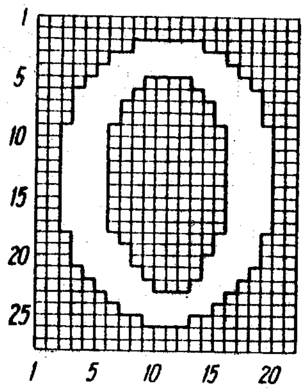
FIGS. 1 to 10 show examples of contour representations of the objects being recognized.

The present method of recognizing objects by their contour representations is based on obtaining closed-open contour characteristics of the contour portions and their sequence in the line-by-line discrete image analysis. Hereafter, all the descriptions of the recognition method will be given for the case of ten numeric character images shown in FIGS. 1 to 10 (some of the character representations are given with distortions). In describing the recognition method, the contour elements will be conventionally designated as "unities" and the background elements as "zeros".

In obtaining closed-open contour characteristics of the contour portions and their sequence, use may be made of a variety of object analysis methods of I—I serial operation, of serial-parallel operation, or of parallel operation (for example, progressive scanning by a rectangular raster, strip- or array-scanning by photocells, magnetic character reading, stored representation reading, etc.), and of logical means varying the program depending on characteristics being detected in the course of line-by-line analysis of the object. In the given examples scanning of object representations is accomplished with the aid of a 28 ×22 raster, which means that each vertical line of the numeric character representation consists of 28 elements and each horizontal line of 22 elements.

The closed-open contour characteristics of the contour portions are fixed relative to the fixed or dividing lines (dividing cross sections) which are automatically determined in the course of line-by-line analysis of the character representation in places of changeover from lines with one number of intersections with the contour to lines with another number of intersections.

The first contour elements as viewed in the direction of character representation analysis found at places of transition from the representation background to the contour line (or vice versa, or both contour elements simultaneously) are taken as intersection points.

Presuming that the analysis of the numeric character representations in FIGS. 1 to 10 is carried out from top to bottom, within a vertical line, and from left to right within the character, the dividing cross sections will be, for instance, in FIG. "O," the third vertical line, found at the place of changeover from lines with a zero number of intersections to lines with one intersection; the seventh vertical line, found at the place of changeover from lines with one intersection to lines with two intersections; the sixteenth and twentieth vertical lines.

Dividing cross sections of the other characters are determined in the same way.

Fixing of certain lines at places where the number of intersections in the lines changes may depend on some conditions, for example, on detecting on certain line type, on the manner of change (changeover of lines of certain types, changeover to lines with larger or lesser number of intersections etc.), on the serial number of changeovers, on the serial number of lines at place of a changeover, on fixing that of changeover lines which has larger or that which has lesser number of intersections, etc.

For eliminating incidental distortions in the object representations, it is sometimes advisable to select the dividing cross sections only in case of repetitive occurrence of lines with a new number of intersections. If the set of objects being recognized is known beforehand, the program of fixing the dividing cross sections can be preset on the basis of the preliminary analysis of most informative changeovers from lines having one number of intersections to lines having another number of intersections. These changeovers are determined by means of a preliminary statistical analysis of the object representations.

For the set of characters being considered the conditions of fixing the dividing cross sections are determined on the basis of a preliminary statistical analysis of the characters and are given in Table 1 (column 5).

TABLE 1

| Recognition characteristics | Legends: Closed contour characteristic | Legends: Open contour characteristic | Legends: Absence of characteristic | Brief description of characteristics |
|---|---|---|---|---|
| 1 | 2 | 3 | 4 | 5 |
| I. The first subclass of objects | | | | The objects of the first subclass include: Those having lines with two intersections repeating successively a preset number of times and having no lines with a greater number of intersections repeating successively several times. |
| (a). The closed-open contour characteristic during the first check. | A1 | A2 | A3 | Check on the contour portions for their being open or closed with respect to the first line with two intersections, which is fixed when the lines with two intersections are encountered for the first time and repeat successively several times. The logical sum contains all the contents of similar elements of all lines up to and including the said fixed line. |
| (b). The closed-open contour characteristic during the second check. | B1 | B2 | B3 | The characteristic is obtained in two cases: 1. Check on the contour portions for their being open or closed with respect to the last line with two intersections, which is fixed when the last changeover from several successive lines with two intersections to lines with another number of intersections takes place. The logical sum contains all the contents of similar elements of lines from and including this line to the end of the object. 2. Check on the contour portions for their being open or closed with respect to the last one of serveral successive lines with two intersections, which is fixed at the changeover from lines with two intersections to one or more successive lines with one intersection, followed by the changeover to the several successive lines with two intersections, the said two changeovers being direct or through the lines of another type. The logical sum contains the contents of similar elements of the lines beginning from this fixed line inclusively and up to the first one of the successive lines having two intersections detected after the lines with one intersection. |

Table I—Continued

| Recognition characteristics | Legends: Closed contour characteristic | Legends: Open contour characteristic | Legends: Absence of characteristic | Brief description of characteristics |
|---|---|---|---|---|
| 1 | 2 | 3 | 4 | 5 |
| (c). The closed-open contour characteristic during the third check. | C1 | C2 | C3 | Check on the contour portions for their being closed or open for the contour representations having alternation of lines as described in paragraph b2 with respect to the first one of the successive lines with two intersections detected after the lines with one intersection. The logical sum contains all the contents of similar elements of all lines up to and including this line. Note.—If after obtaining the characteristics according to "b" and "c"; the alternate lines with the number of intersections 2, 1, 2 are encountered again, the next two closed-open contour characteristics are fixed in the way specified in paragraphs "b" and "c". |
| (d). The closed-open contour characteristic during the last check. | D1 | D2 | D3 | The characteristic is obtained in the way it was done during the second check according to paragraph 1 or Note. |
| II. The second subclass of objects | | | | The objects of the second subclass include those having lines with three intersections repeating successively a preset number of times and having no lines with a greater number of intersections repeating successively several times. |
| (a). The closed-open contour characteristics during the first check. | E1 | E2 | ------------ | Check on the contour portions for their being closed or open with respect to the first line with three intersections which is fixed when the lines with three intersections are encountered for the first time and repeat successively several times. The logical sum contains all the contents of similar elements of all the lines up to and including the line. The contour portions are checked for their being closed or open between the points of the first and the second intersections in the said line. |
| (b). The closed-open contour characteristic during the second check. | F1 | F2 | ------------ | The characteristic is obtained in the way specified in paragraph "a", with the difference in that the contour portions are checked between the points of the second and third intersections in the fixed line with three intersections. |
| (c). The closed-open contour characteristic during the third check. | G1 | G2 | ------------ | Check on the contour portions for their being closed or open with respect to the last line with three intersections, which is fixed at the last changeover from several successive lines with three intersections to lines with another number of intersections. The logical sum contains the contents of similar elements of all the lines from this line up to the end of the object. The contour portions are checked for their being closed or open between the first and second intersections in said line. |
| (d). The closed-open contour characteristic during the fourth check. | H1 | H2 | ------------ | The characteristic is obtained in the way specified in paragraph "c", with the difference in that the contour portions are checked between the points of second and third intersections in the fixed line with three intersections. |

If the set of objects being recognized is not known beforehand the dividing cross sections are fixed on detection of stable changeover from lines with one number of intersections to lines with another number of intersections, the most general conditions of fixing the dividing cross sections being: a line with a greater or lesser number of intersections, the first or the second line at the place where the number of intersections in the lines changes, etc.

The program of fixing the dividing cross sections is worked out in the process of classifying the object representations (at the stage of learning or self-learning of the system).

In the herein presented examples, the scanning of numeric characters was effected by straight lines though the same method may be realized by using curvilinear lines.

It is proposed to check the contour for its being open or closed between the intersection points in the dividing cross sections by the logical sums of element contents of lines pertaining to the appropriate sections of contour representation. The said sections of contour representation may be defined by dividing cross sections as follows:

1. from the object representation beginning up to the dividing cross section;
2. between two adjacent dividing cross sections;
3. between a dividing cross section and the representation end;
4. between any two dividing cross sections or between any dividing cross section and the beginning or end of the representation.

The logical summation of line elements coded as unities and zeros is performed according to the well-known rule:

$$0+0=0$$
$$0+1=1$$
$$1+0=1$$
$$1+1=1$$

The logical sums of line codes pertaining to the appropriate sections of contour representation represent section codes.

A digit of a section code may be obtained by logical summation of line code digits having the same serial number in line code word, i.e., by the logical summation of contents of line elements arranged in rows perpendicular to the dividing cross sections. This case in Table 1 is expressed by denoting, as similar, the line elements to be summed. The forming of section code digits may be effected also by the logical summation of the contents of the line elements arranged in any other way (for example, at some angle) with respect to the fixed lines.

If the set of objects being recognized is known beforehand, the program of fixing the object representation sections for which section codes are formed, for instance logical sums of contents of the line elements, can be worked out on the basis of a preliminary statistic analysis of the objects being recognized.

If the set of objects being recognized is not known, section codes of the contour representation are formed between two adjacent dividing cross sections or between all the dividing cross sections being detected; the final program of dividing the contour representation into sections is worked out at the stage of learning or self-learning of the system.

The absence of zero digits in the logical sum between digits corresponding to the intersection points is taken as a closed-contour portion criterion between the intersections in a dividing cross section, and conversely, the presence of zero digits in the logical sum between the intersection points is indicative of the contour being open. When lines with two intersections are taken as the dividing cross sections, it is possible to employ simplified criteria for obtaining the closed-open contour characteristics, namely, the absence or presence in to logical sum of zero digits between unity digits. The above circumstance simplifies, to some extent, the processing of the obtained closed-open contour characteristics of the contour portions and their sequence, as it is unnecessary in this case to store the coordinates of intersection points in the dividing cross section. The criteria (thresholds) for obtaining some closed-open contour characteristics can be varied.

To make the obtained closed-open contour characteristics of the contour portions and their sequence more resistant to interference, we suggest the following:

1. Contour portions with the number of successive contour elements greater than some threshold value $x_1$ should be taken as intersections in the scanning line, while the following intersection in the line should be fixed only if it is separated from the preceding one by the number of background elements greater than some threshold value $x_2$, thus elimination of incidental clouding of the background and intervals in the contour being achieved. For example, if $x_1=2$ and $x_2=2$, then fourth, fifth, sixth, 13th and 14th vertical lines in the representation of the character 1 (FIG. 2) have two intersections, whereas the eighth, ninth and 12th lines have one intersection.

2. The dividing cross sections should be fixed only in case of a stable changeover from lines with one number of intersections to lines with another number of intersections, i.e., if the lines with a new number of intersections repeat successively several times. For example, in the representation of character 7 (FIG. 8) the third vertical line with two intersections found only once after lines with a zero number of intersections is not taken as a dividing cross section.

Object recognition according to the closed-open contour characteristics of the contour portions is based:

a. on a preliminary classification of two-dimensional contour representations of object into subclasses featuring the presence of scanning lines with a specified number of intersections (of Table 1), of which the first subclass comprises objects having several successive lines with two intersections and no successive lines with a greater number of intersections, and of which the second subclass comprises objects having several successive lines with three intersections; and so on.

b. on a further classification of contours representation according to the sequence of closed-open contour characteristics fixed with respect to dividing cross sections within each subclass (of Table 1).

The comparison of the obtained sequence of closed-open contour characteristics with the reference sequences of objects belonging to various classes is accomplished in accordance with any known classification scheme (complete coincidence, Hamming distance, correlation and so on).

Objects with certain distortions may be at first wrongly classified, but the error of the primary classification can be detected by the code not characteristic of the object representations of this subclass.

Sometimes classification can be accomplished in one stage, i.e., the preliminary dividing of objects into subclasses can be omitted.

Due to the association of the sequences of closed-open contour characteristics of the contour portions with dividing cross sections, according to the behavior of the contour line in the neighboring scanning lines, and due to the fact that the closed-open contour conditions are checked between intersection points in the dividing cross section, invariance of sequences of the closed-open contour characteristics to displacements of the object representations within the recognition frame is achieved.

The conditions of fixing the sequence of closed-open contour characteristics of the contour portions the representations into subclasses for the set of characters and the conditions of dividing the representations into subclasses for the set of characters being considered when they are analyzed by means of vertical lines are given in detail in Table 1. The characteristics in the table are designated with A1; A2; A3; B1; B2; B3 and so on.

Derivation of closed-open characteristics of contour portions for the character set 0 to 9 (FIG. 1–10) is given in table 1*a*.

In working out the closed-open contour characteristics of the contour portions, presented in table 1*a*, the following conditions were adopted:

an intersection in the line was fixed on detection of two or more successive unity digits in the line code. The following intersection in the line was required to be separated from the preceding one by two or more successive zero digits;

the dividing cross section was fixed if lines with a new number of intersections repeated successively not less than two times;

the presence of at least two successive zero digits in the logical sum between intersection points in the dividing line was adopted as an open contour criterion.

One of the possible reference sets of characteristics for the numeric characters being considered is given in Table II. In describing some of the characters, several parallel codes of the sequences of closed-open contour characteristics of the contour portions are used to make allowance for the most probable distortions of the characters and for a considerable variation in their configuration. The character designations used in Table 1 are employed in Table II too. For instance, the representation of figure "2" is characterized by two parallel principal reference code E2F1G1H2 and E2F1G1H2 and E2F1G2H2.

In classifying the objects use can also be made of the characteristic A2 (for figure "2").

TABLE 2

Figure 2:
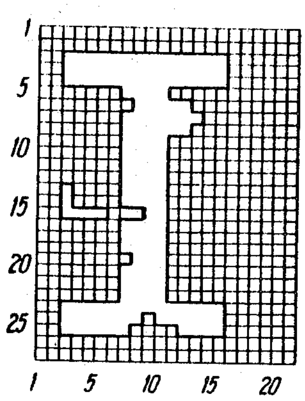
Figure 3:
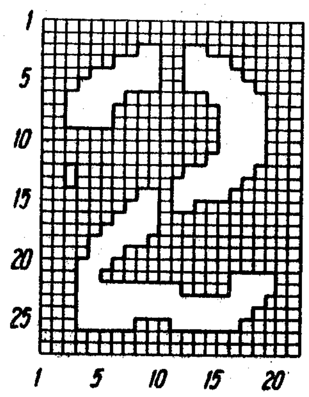
Figure 4:
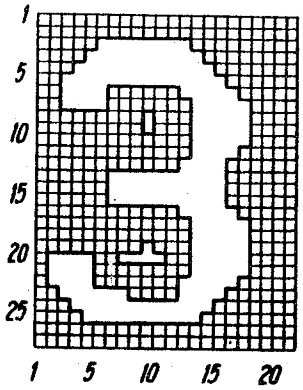
Figure 5:
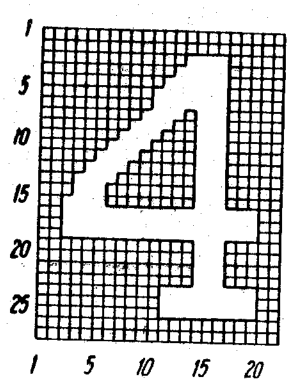
Figure 6:
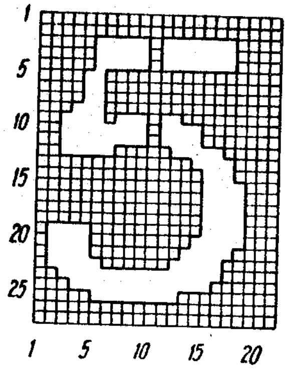
Figure 7:
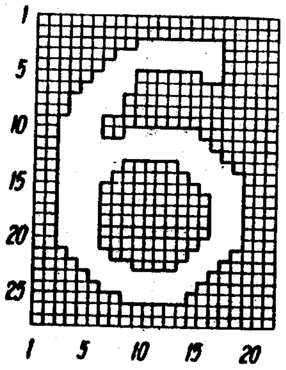
Figure 8:
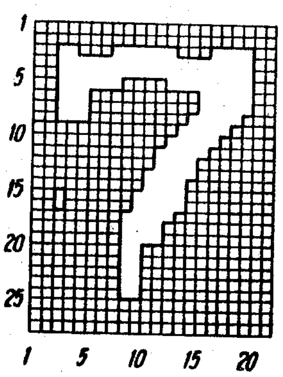
Figure 9:
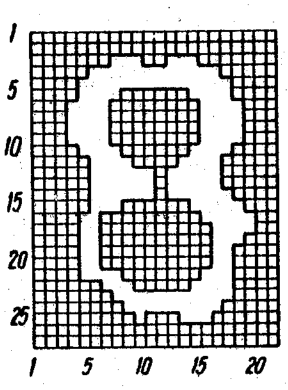
Figure 10:
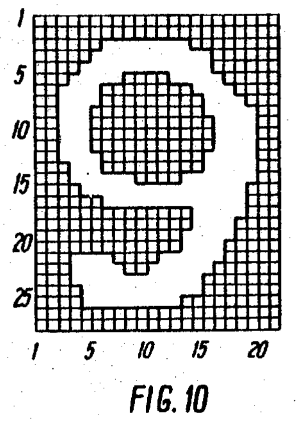

| Character 1. | Possible codes 2. | Note 3. |
|---|---|---|
| zero | A1B1C3D3<br>A1B2C3D3<br>A1B2C1D1 | |
| FIG. 1 | A2B1C1D2<br>no check on closed-open contour cha- | |
| racteristic | | |
| FIG. 2 | E2F1G1H2<br>E2F1G2H2 | possible supplementing of codes with characteristic A2. |
| FIG. 3 | E2F2G1H1 | Possible supplementing of code with characteristic A2. |
| FIG. 4 | A1B1C1D2<br>E1F2G1H1<br>no check on closed-open contour characteristic | Possible supplementing of code with characteristic A1. |
| FIG. 5 | E1F2G2H1<br>E1F2G2H2 | Possible supplementing of codes with characteristic A2. |
| FIG. 6 | E1F1G2H1<br>E2F1G2H1 | |
| FIG. 7 | A2B1C3D3<br>A2B2C2D1 | |
| FIG. 8 | E1F1G1H1<br>E2F1G1H1 | |
| FIG. 9 | E1F2G1H1<br>E1F2G1H2 | Possible supplementing of codes with chracteristic A2. |

TABLE Ia

| Character | Fig. No. | Section designation | Line No. determined as dividing cross-section | No. of lines pertaining to section | Designation of characteristics detected in section | Notes |
|---|---|---|---|---|---|---|
| 0 | 1 | I | 7 | 1+7 | A1 | |
| | | II | 16 | 16+21 | B1 | |
| 1 | 2 | I | 4 | 1+4 | A2 | |
| | | II | 7 | 7+12 | B1 | |
| | | III | 12 | 1+12 | C1 | |
| | | IV | 16 | 16+17 | D2 | |
| 2 | 3 | I | 3 | 1+3 | A2 | |
| | | II | 7 | 1+7 | E2, F1 | |
| | | III | 15 | 15+21 | G1, H2 | |
| 3 | 4 | I | 3 | 1+3 | A2 | |
| | | II | 7 | 1+7 | E2, F2 | |
| | | III | 13 | 13+19 | G1, H1 | |
| 4 | 5 | I | 7 | 1+7 | A1 | |
| | | II | 12 | 1+12 | E1, F2 | |
| | | III | 14 | 14+21 | G1, H1 | |
| 5 | 6 | I | 3 | 1+3 | A2 | |
| | | II | 7 | 1+7 | E1, F2 | |
| | | III | 15 | 15+20 | G2, H1 | |
| 6 | 7 | I | 7 | 1+7 | E1, F1 | |
| | | II | 16 | 16+20 | G2, H1 | |
| 7 | 8 | I | 9 | 1+9 | A2 | |
| | | II | 15 | 15+21 | B1 | |
| 8 | 9 | I | 8 | 1+8 | E1, F1 | |
| | | II | 15 | 15+21 | G1, H1 | |
| 9 | 10 | I | 4 | 1+4 | A2 | |
| | | II | 6 | 1+6 | E1, F2 | |
| | | III | 14 | 14+21 | G1, H1 | |

It is obvious that a reference set of closed-open contour characteristics can be worked out not only on the base of preliminary analysis of the objects to be recognized (Table 2) but also on the base of closed-open contour characteristics of contour portions obtained when analyzing objects to be recognized. In this case for obtaining closed-open contour characteristics of contour portions are used the above-mentioned general conditions of fixing lines at places of their changeover from lines with one number of intersections with contour to lines with another number of intersections as well as the general conditions of dividing object to be recognized into sections. After closed-open contour characteristics of contour portions of an object are obtained they are stored as reference characteristics. $I_f$ for an object being analyzed afterwards are obtained the same characteristics as for a precedent object, this object is determined as belonging to the same class of objects. If characteristics derived do not coincide sufficiently with some of stored characteristics, they are stored for subsequent use as reference characteristics.

An embodiment of the system for object recognition realizing one of the possible versions of the present method forming the invention is now described.

Figure 11:
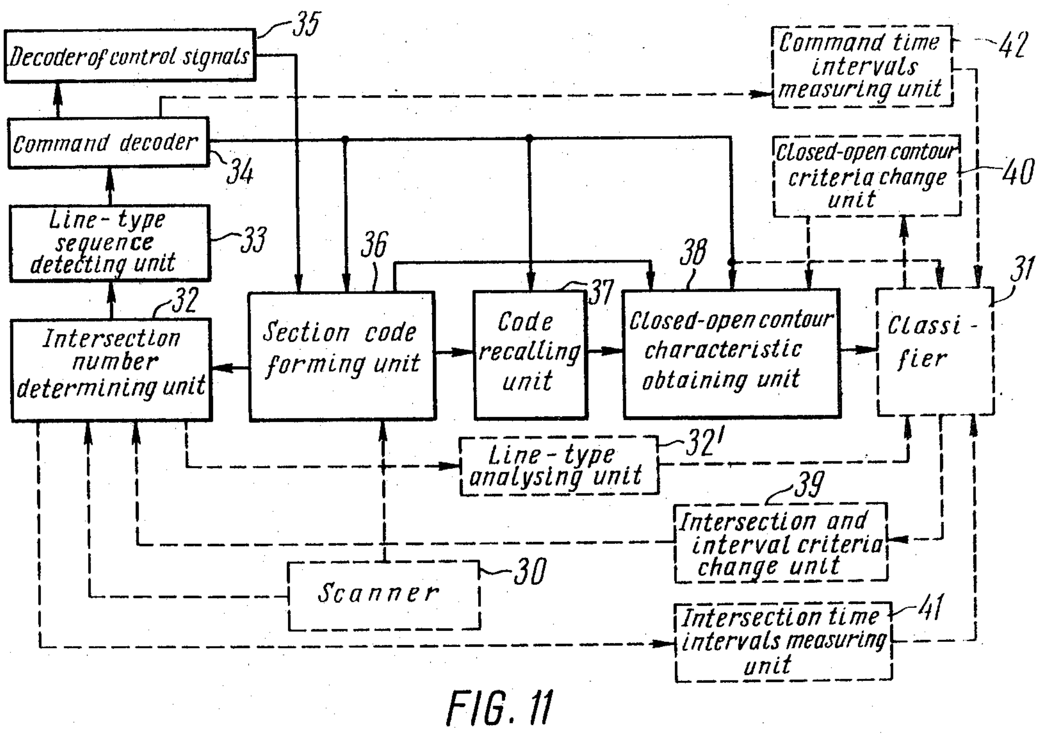
FIG. 11 is a block diagram of the automatic recognition system, according to the invention.

The automatic system for recognizing objects by their contour representations comprises: a unit 30 for reading out information on objects being recognized (FIG. 11) and a logic unit and a classifier means 31.

The logic unit includes a unit 32 for determining the number of intersections and producing line-type signals, connected to the readout unit 30, a circuit 33 for obtaining and storing the sequence of line types connected to the intersection determining unit 32. A command decoder 34, coupled to the circuit 33 for obtaining and storing the line-type sequence, is also connected to a control signal decoder 35 and to a unit 36 for forming and storing the section codes of contour representation and intersection coordinates coupled to the readout unit 30.

The automatic system comprises also a unit 37 for distributing section codes of contour representation coupled to the unit 36 for forming and storing the section codes of contour representation and intersection coordinates and to a circuit 38 for obtaining closed-open contour characteristics of contour portions connected with the classifier 31. The command decoder 34 is coupled to the circuits 37 and 38.

A unit 36 for forming and storing the section codes of contour representation and intersection coordinates is also connected to the control signal decoder 35 and to the circuit 38 for obtaining closed-open contour characteristics of the contour portions.

A unit for forming logical sums and obtaining the intersection coordinates in the fixed lines can be used as the unit 36 for forming and storing the section codes of contour representation.

Provision is made in the automatic system for feedback couplings intended for varying the criteria determining the conditions of obtaining the sequence of closed-open contour characteristics of the object. The feedback couplings are effected by connecting the classifier 31 output to the intersection number determining unit 32 through a circuit 39 which controls the change of intersection and interval criteria, as well as by connecting the classifier 31 output of the circuit 38 for obtaining closed-open contour characteristics through a circuit 40 which controls the change of the closed-open contour criteria.

The feedback couplings operate on the appearance of a signal indicative of the uncertainty decision being taken on the object being recognized.

The automatic system is also provided with a number of circuits for determining additional characteristics concurrently with the principal closed-open contour characteristics, i.e., a circuit 41 for measuring time intervals between intersections in the object representation lines coupled to the unit 32 for determining the number of intersections and producing line-type signals and to the classifier 31, and a circuit 42 for measuring time intervals between the commands coupled to the command decoder 34 and to the classifier 31.

Line-type signals may be transferred from the unit 32 for determining the number of intersections and for producing line-type signals to the classifier 31 via the unit 32' for analyzing the line-type signals. The said characteristics of time intervals between the intersections in the contour representation lines, and the characteristics of time intervals between the commands, and the line-tYpe characteristics may be used simultaneously with the closed-open contour characteristics for the classification of the objects being recognized.

It should be noted that in obtaining the additional characteristics use is made of information employed for obtaining the principal closed-open contour characteristics.

Figure 12:
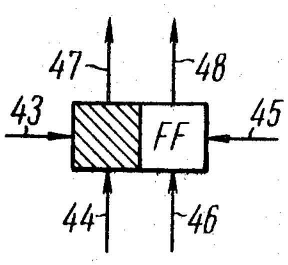
FIGS. 12, 13, 14 illustrate conditional notations for the elements used in constructing the functional block diagram, according to the invention.
Figure 14:
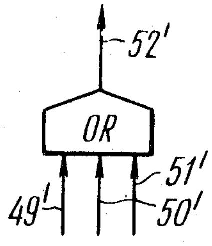
Figure 13:
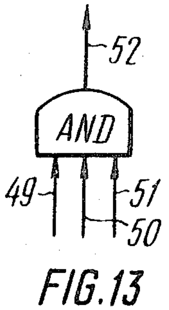

FIGS. 12, 13 and 14 illustrate the symbols being adopted for a flip-flop circuit and AND, OR gates employed in constructing the functional diagrams of the automatic system. The cross hatched half of the flip-flop (FIG. 12) denotes the zero arm.

The flip-flop is switched into the balanced (zero) state by signals fed to inputs 43 and 44, and into the unbalanced (unity) state by signals fed to inputs 45 and 46. Outputs 47 and 48 are zero and unity outputs, respectively.

The AND and OR gates shown in FIGS. 13 and 14 have inputs 49, 50 51 and 49', 50', 51' and outputs 52 and 52', respectively.

The functional diagram of the automatic system is constructed for the case when each vertical line of the scanning frame contains 28 elements.

The unit 32 (FIG. 15) for determining the number of intersections and producing line-type signals includes a circuit for detecting intervals between the intersections according to the number of zero digits between unity digits in the line code, which employs AND-gates 53, 54 and 55, an OR-gate 56 and a switch 57, and it further includes a circuit for intersection detection under the preset criteria in accordance with the number of unity digits in the line codes, employing an OR-gate 58, an AND-gate 59 and a switch 60.

The AND-gate 53 is designed for fixing intervals found between the intersections on detecting two successive zero digits in the line code, the AND-gate 54—on detecting three successive zero digits, the AND-gate 55 on detecting one of the "00100" or "00000" sequences. The AND-gate 53 is coupled directly to the switch 54, whereas the AND-gates 57 and 55 are coupled to the switch 57 through the OR-gate 56.

The intersection detecting circuit is for detection of intersections with the criteria corresponding to the following code sequences "1," "11" or "101." To this end the signals with the first criterion are fed directly to the switch 60, with the second and third criteria, the signals are fed to the gates 58 and 59, whereas the intersection signals are fixed at the gate 59 output. The intersection detection circuit output is coupled to the unity input of a flip-flop 61, while the interval detection circuit output is coupled to its zero input. The flip-flop 61 is coupled to a counter 62 which, in turn, is coupled to a circuit 63 for determining the line types according to the number of intersections in the lines being analyzed.

The manner of coupling the intersection and interval detection circuits to the reception busses of the line-code signals and the selection of elements constituting these circuits depend, in the common case, on the selected intersection and interval criteria.

The circuit 63 for determining the line types according to the number of intersections on the contour in the line being analyzed and according to the sequence of the lines being analyzed produces line-type signals *n*1, *n*2, *n*3, *n*4, *n*5, *n*6, *n*7 and *n*8.

These signals and, accordingly, line types are characterized as follows: *n*1—the line without intersection ("0 intersection" line);

*n*2—the line with one intersection ("1 intersection" line);

*n*3—the line with two intersections ("2 intersections" line);

*n*4—the line with three intersections ("3 intersections" line);

*n*5—the line with four and more intersections ("$\geq$ 4 intersections" line);

*n*6—the second successive line without intersections with the contour encountered after the lines with any other number of intersections, namely the line indicative of the end of the object analysis ("0 intersections X2" line);

*n*7—the second successive line with two intersections found after the lines with any other number of intersections or on detection of the object beginning ("2 intersections X2" line);

*n*8—the second successive line with three intersections found after the lines with any other number of intersections or on the detection of the objects beginning ("3 intersections X2" line).

The circuit 33 for obtaining and storing the line-type sequence comprises storage elements in the form of flip-flop circuits 64, 65, 66, 67, 68, 69, 70, 71, 72, OR-gates 73, 74, 75, 76, 77, 78, 79, 80, AND-gates 81, 82, 83, 84, 85, 86, the flip-flop circuits and the OR and AND gates being so interconnected as to determine the required sequence of the line-type signals, such sequence being used in forming commands in the command decoder 34. Selected from all possible line-type sequences, i.e., from all possible states of the circuit 33 for obtaining and storing the line-type sequence are only those instrumental in forming commands K1, K2, K3, K4, K5, K6, K7, K8 for controlling the unit 36 for forming and storing the section codes of contour representation and intersection coordinates (FIG. 11), the circuit 37 for distributing section codes of contour representation, the circuit 38 for obtaining the closed-open contour characteristics of the contour portions.

With the unknown set of objects being recognized the connection of the elements of the circuit 33 for obtaining and storing the line-type sequence is performed so as to determine any changeover from lines with one number of intersections to lines with another number of intersections. The outputs of the command decoder 34 are connected to the inputs of the control signal decoder 35 the outputs of which are connected to the unit for forming logical sums and for obtaining the coordinates of intersections in fixed lines.

Decoders 34 and 35 can be of any conventional design.

In the present embodiment, the circuit 33 (FIG. 15) comprises a plurality of storage elements in the form of flip-flop circuits 64 to 67, OR-gates 73, 74 and AND-gates 82, 83 for fixing the line type "3 intersections X2" in the line-type sequences, a plurality of storage elements in the form of flip-flop circuits 68–70, an OR-gate 75 and AND-gates 84, 85 for fixing the line of the type "2 intersections X2," a flip-flop 71 for fixing the line of the type "0 intersection X2," a flip-flop 72, OR-gates 76, 77 and AND-gates 81, 86 for fixing the presence of the line of the type "1 intersection" in the type line sequence between lines of the type "2 intersections X2," OR-gates 78 to 80 for producing signals, correspondingly: *x* signal indicative of the fact that the analyzed line belonged to one of the following types: "0 intersection," "1 intersection," "3 intersections," "$\geq$ 4 intersections" ($x = n1 \vee n2 \vee n4 \vee n5$); *y* signal indicative of the fact that the analyzed line belonged to one of the following types: "0 intersection," "1 intersection," "2 intersections," "$\geq$ 4 intersections" ($y = n1 \vee n2 \vee n3 \vee n5$); and Z signal indicative of the fact that the analyzed line belonged to one of the following types: "0 intersection," "1 intersection," "2 intersections," "3 intersections," "$\geq$ 4 intersections" ($z = n1 \vee n2 \vee n3 \vee n4 \vee n5$). These signals are delivered to the command decoder 34.

The unity inputs of the flip-flops 64 to 66 are coupled to the line-type determining circuit 63 by means of the *n*8 signal bus. The zero input of the flip-flop 66 is connected with the gate 74, whose one input is coupled to the gate 82, which is connected by its input to the output of the gate 79, from which the *y* signal is taken. The unity output of the flip-flop 64 delivers a signal *b*4 to the bus, whereas the inverse signal $\overline{b4}$ is taken from its zero output, the corresponding outputs of the flip-flops 65, 66, 67 producing signals *b*1, $\overline{b1}$, *b*2, $\overline{b2}$, *b*3, $\overline{b3}$. The unity input of the flip-flop 67 is coupled to the gate 83, whose inputs are coupled to the unity output of the flip-flop 66 and to the gate 79.

Unity inputs of the flip-flops 68, 69 are coupled to the circuit 63 by means of an *n*7 signal bus, the zero input of the flip-flop 69 is coupled to the gate 75, one of the inputs of which is connected to the gate 84, the input of the latter being connected to the gate 78, from which signal *x* is taken. The unity input of the flip-flop 70 is connected to the gate 85, whose inputs are coupled to the unity output of the flip-flop 69 and to the gate 78. The unity output of the flip-flop 68 produces a signal *a*1, whereas its zero output produces the inverse signal $\overline{a1}$, the corresponding outputs of the flip-flops 69, 70 produce signals *a*2, $\overline{a2}$, *a*3, $\overline{a3}$.

The unity input of the flip-flop 71 is coupled to the circuit 63 by means of the *n*6 signal bus. The unity output of this flip-flop produces a signal *c*, whereas its zero output produces the inverse signal *c*.

The unity input of the flip-flop is coupled to the gate 81, whose inputs are coupled to the circuit 63 by means of the *n*2 signal bus, and to the gate 77, whose inputs are coupled to the unity outputs of the flip-flops 69 and 70, whereas the zero input of the flip-flop 72 is coupled to the gate 76 whose input is coupled to the gate 86, the input of the latter being connected to the unity output of the flip-flop 68. At the unity output of the flip-flop 72 there appears a signal *d*, and at the zero output thereof an inverse signal $\overline{d}$.

In the given embodiment of the invention the command decoder 34 (FIG. 15) is connected to the signal *a*1, $\overline{a1}$, *a*2, $\overline{a2}$, *a*3, $\overline{a3}$, *b*1, $\overline{b1}$, *b*2, $\overline{b2}$, *b*3, $\overline{b3}$, *b*4, $\overline{b4}$, *c*, $\overline{c}$, *d*, $\overline{d}$, *x*, *y*, *z*, buses for determining the K1–K8 commands in accordance with the sequence of the line types.

The unit for forming logical sums and obtaining the intersection coordinates in the fixed lines comprises a reception shift register 87 (FIG. 16), employing flip-flops $88^{I}$, $88^{II}$, $88^{III}$, $88^{IV}$, $88^{V}$, 88 a register 89 for intermediate storing of the line codes, employing flip-flops 90, a shift register 91 for forming logical sums, employing flip-flops 92 and a shift register 93 for storing the fixed line codes, employing flip-flops $94^{I}$, $94^{II}$, 94.

All the unit registers are interconnected by means of control circuits employing AND-gates 95, 96, 97 and with other circuits of the machine, such as the registers via the OR-gates 98, 99, 100 and AND-gates 101, 102. The contents of one register are transferred to another register in parallel via the gates 95, 96, 97.

The unit for forming logical sums and obtaining the intersection coordinates in the fixed lines also includes a circuit 103 for fixing intersections coordinates, connected to flip-flops 94 and comprising a circuit for detecting intersections with preset criteria in accordance with the number of unity digits in the fixed line codes, employing AND- and OR-gates 104, 105; 106, 107 and a switch 108, and a circuit for detecting intervals between intersections in the fixed line, employing AND- and OR-gates 109, 110, 111, 112, 113 and a switch 114.

Figure 16:
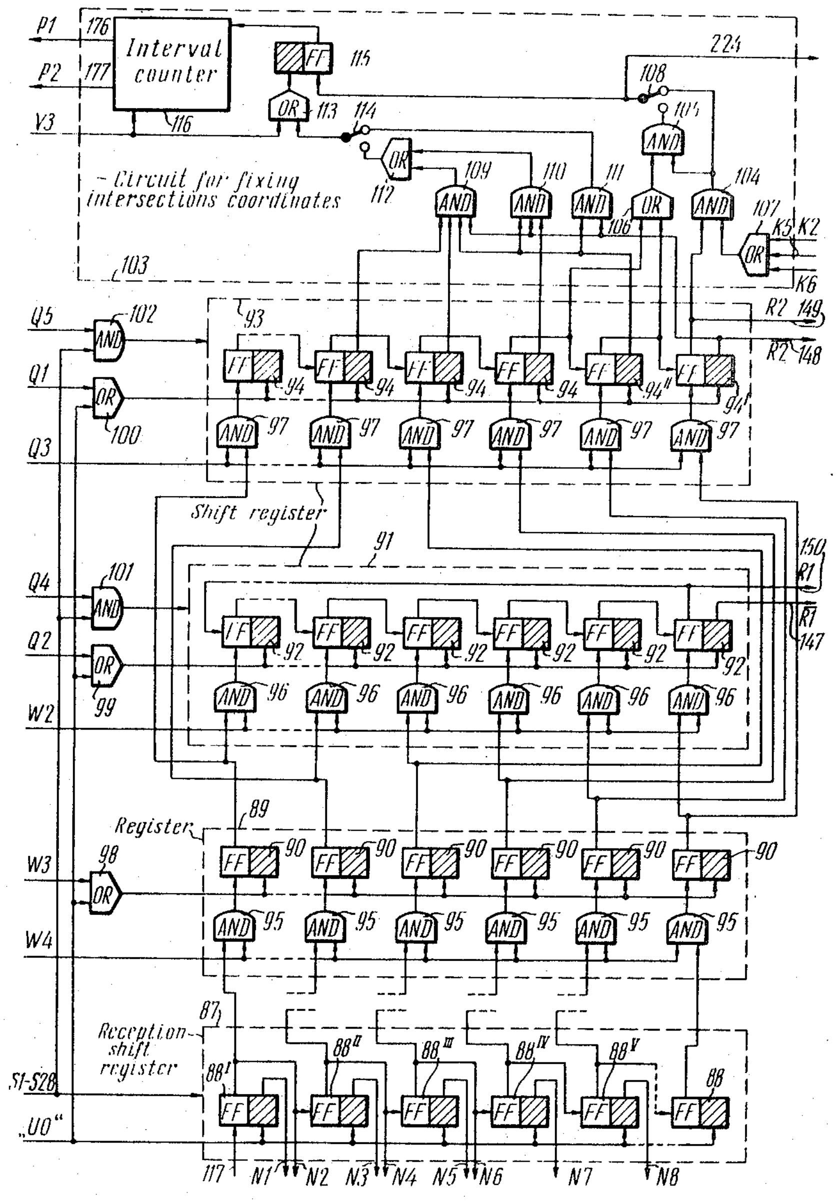

The circuit 103 for fixing intersection coordinates also includes a flip-flop 115 and an interval counter 116 and is connected with the command decoder 34 (FIG. 11) via an OR-gate 107 (FIG. 16).

Figure 15:
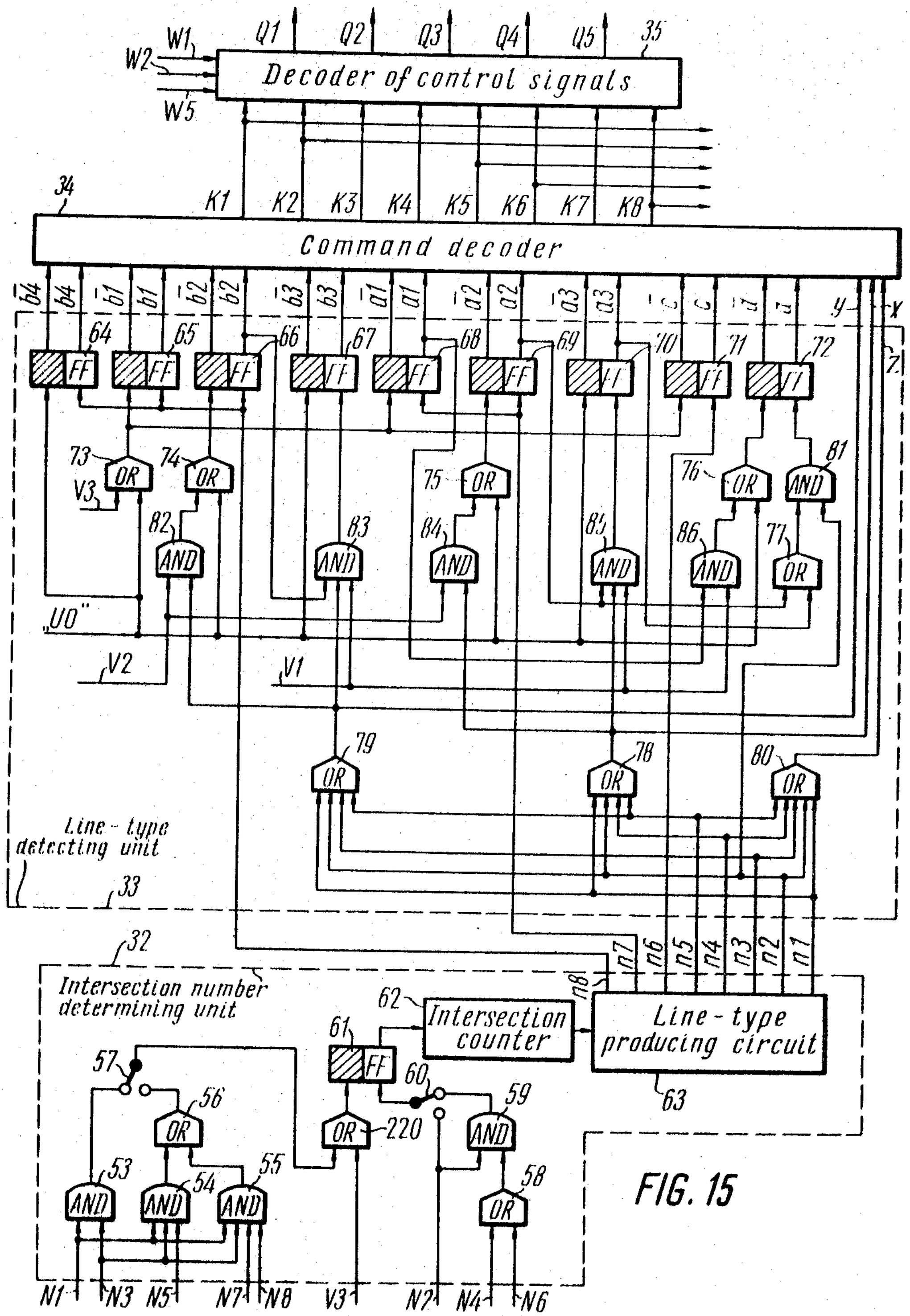
FIGS. 15, 16, 17 are detailed functional block diagrams of the recognition system of the present invention.

The binary code of the line arrives successively at the reception shift register 87 (FIG. 16) from the readout unit 30 (FIG. 11) via a bus 117 and from flip-flops 88 of this register the N1, N2, N3, N4, N5, N6, N7, N8 signals arrive at the unit 32 (FIG. 15).

The inputs of the gate 53 of this unit are connected to the zero outputs of the flip-flops $88^{I}$ and $88^{II}$, the inputs of the gate 54 are connected to the zero outputs of the flip-flops $88^{I}$, $88^{II}$ and $88^{III}$, the inputs of the gate 55 are connected to the zero outputs of the flip-flops $88^{I}$, $88^{II}$, $88^{IV}$ and $88^{V}$. The inputs of the gate 58 are connected to the unity outputs of the flip-flops $88^{II}$ and $88^{III}$ and the inputs of the gate 59 are connected to the unity output of the flip-flop $88^{I}$ and to the output of the gate 58, the output of the gate 59 being connected to the switch 60.

The readout unit 30 may be connected to the unit 32 for determining the number of intersections and producing line-type signals directly, bypassing the reception shift register 87 of the unit 36 for forming the logical sum.

Figure 18:
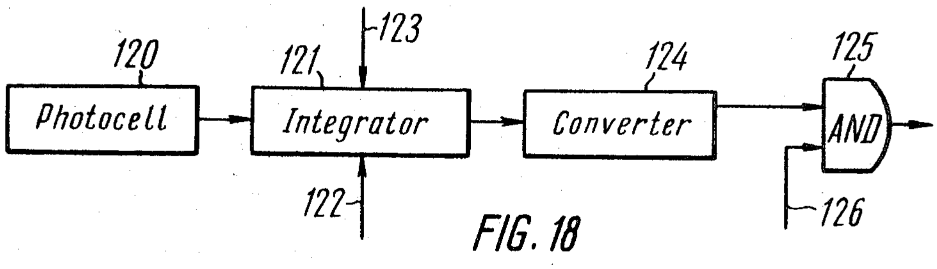
FIG. 18 shows an embodiment of a channel for forming contour representation section code incorporated in the unit for forming and storing codes of contour representation and intersection coordinates, in accordance with the invention.

In case of nonbinary values of line code digits, for example, with other discrete or analogue values, the channels for fixing digits of the contour representation section codes of the unit 36 (FIG. 11) have got another structure. Two possible embodiments of these channels are shown in FIGS. 18 and 19.

On arrival of an analogue signal, for example from a photocell 120 (FIG. 18) of the readout unit 30, the signal is integrated by an integrator 121, which is set to zero by a signal arriving via a bus 122 before the section code formation commences.

The end of the integration process is determined by a signal corresponding to the fixed line which indicates the end of the section and arrives via a bus 123. The resulting signal at the output of the integrator 121 expresses the sum of signal values of the similar line elements of the contour representation section, being analyzed. The integration results are transformed into a binary code by a converter 124 and is supplied to the circuit 38 for obtaining the closed-open contour characteristics of the contour portions (FIG. 11), via an AND-gate 125, when a signal, indicative of the beginning of the check on the closed-open contour characteristics arrives at the second input 126 (FIG. 18) of the gate 125.

Figure 19:
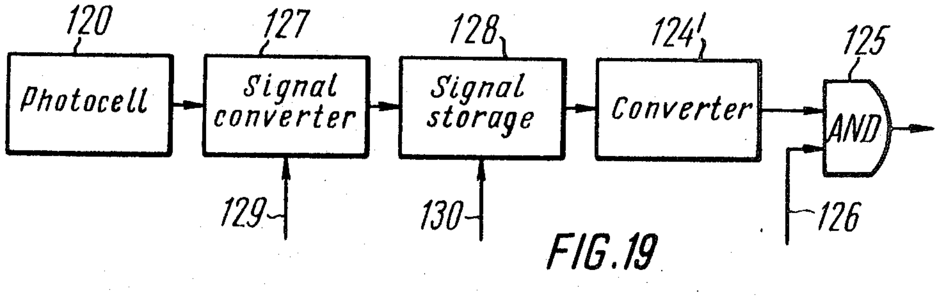
FIG. 19 is a second embodiment of the same channel, according to the invention.

The channel for forming section codes shown in FIG. 19 differs from the previous one in that it employs an analog-to-discrete signal converter 127 and a discrete signal storage 128 for producing and storing the sum of the discrete signals corresponding to the similar elements in the lines of the contour representation section being analyzed. The resulting code digit value is converted into the binary value by the converter 124[1], connected with the storage 128. The analog-to-discrete conversion of signals is executed at time instants corresponding to the moments of taking off the line element signals, which are employed in the formation of section codes. These movements are defined by the signals arriving via a bus 129. The storage 128 is set to zero in the beginning of the code introduction by a signal arriving via a bus 130.

The structure of the automatic recognition system may remain basically the same in case of using the nonbinary section codes for detecting closed-open contour characteristics without converting section codes into binary codes in the circuit of the type 18 and 19. In this case preset nonbinary code sequences in line codes and in section codes respectively are taken as the criteria for detecting the intersections in the lines and interval between intersections and for obtaining the closed-open contour characteristics of contour portions.

FIG. 37 shows the circuit 37 for distributing section codes of contour representation and the circuit 38 for obtaining closed-open contour characteristics of the contour portions.

Circuit 37 comprises two channels of logical sum code distribution, the first of which is intended for distributing the logical sum codes being checked for the presence of closed-open contour characteristics with respect to the lines having three intersections. This channel consists of AND- and OR-gates 131, 132, 133, 134.

The second channel consisting of AND-gates 135, 136, 137, 138 and OR-gates 139, 140, 141 is intended for distributing the logical sum codes being checked with respect to the lines having two intersections.

The inputs of the gates 133, 132, 135, 136, 141 are connected to the command decoder 34 (FIG. 15) via buses 142, 143, 144, 145, 146 for forming commands K2, K8, K6, K5, K1.

Figure 17:
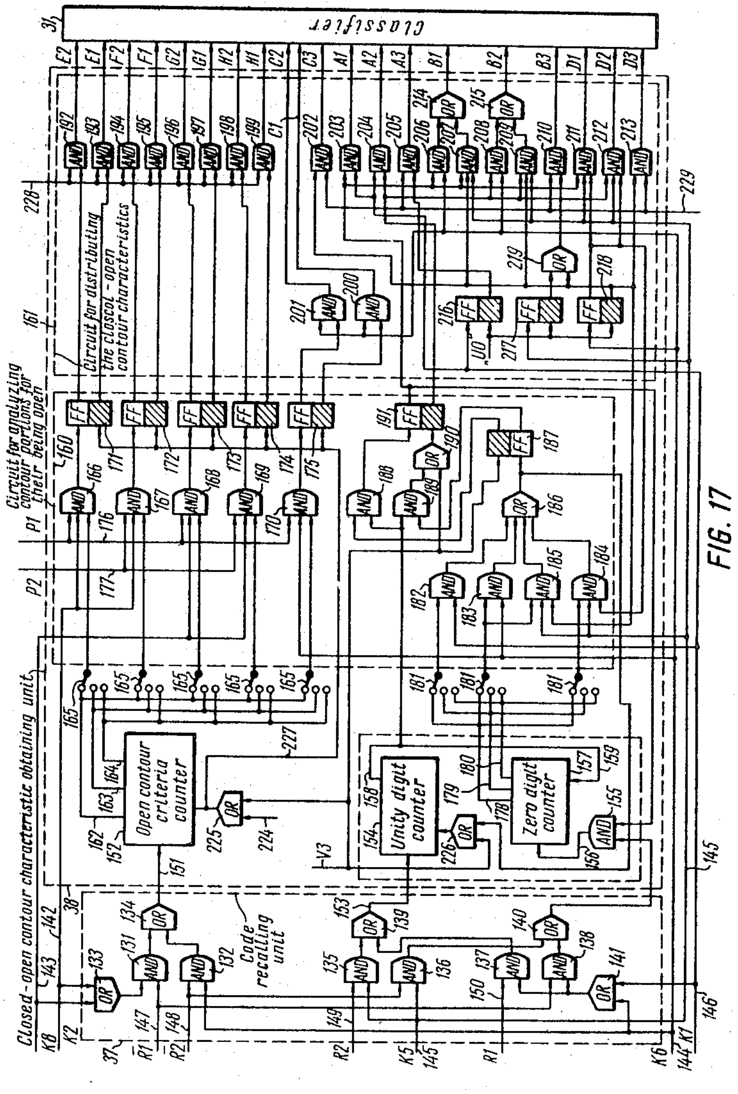

The inputs of the gates 131, 132, 135, 136, 137, 138 (FIG. 17) are connected via buses 147, 148, 149, 150 to the outputs of the logical sum formation shift register 91 (FIG. 16) and to the outputs of the fixed line code storing shift register 93.

The outputs of the gates 134, 139, 140 (FIG. 17) are connected respectively to an input 151 of an open contour criteria counter 152, to the input 153 of a unity digit counter 154 and via an AND-gate 155 to the input 156 of a zero digit counter 157 of the circuit 38 for obtaining closed-open contour characteristics.

The output 158 of the counter 154 is connected to a reset input 159 of the counter 157.

The circuit 38 also comprises a circuit 160 for analyzing contour portions for their being open and a circuit 161 for distributing the closed-open contour characteristics.

Circuit 160 employs two channels, the first of which consists of AND-gates 166, 167, 168, 169, 170 and flip-flops 171, 172, 173, 174, 175, the unity inputs of which are connected to the outputs of the gates 166–170, respectively.

The channel is connected to outputs 162, 163, 164 of the counter 152 via switches 165 which determine open contour criterion of the contour portions and which are, for instance, a three-way switch, each position thereof corresponding to different criteria, determined by the contour 152.

The gates 166, 167 and the gates 168, 169 are connected to the command decoder 34 (FIG. 15) via buses 142, 143 respectively. Besides, the gates 166, 168 (FIG. 17) and the gates 167, 169 are connected to the interval counter 116 (FIG. 16) via, busses 176, 177 respectively. The second channel of the circuit 160 (FIG. 17) is connected to outputs 178, 179, 180 of the counter 157 via switches 181 performing a function identical to that of the switches 165, with the difference in that the open-contour criterion is determined by the counter 157. This channel consists of AND-gates 182, 183, 184, 185, the outputs of which are connected to an OR-gate 186, which, in turn, is connected to a flip-flop 187, of a plurality of AND- and OR-gates 188, 189, 190 with a flip-flop 191 producing the open-contour signal only between the unity sequences in the logical sum which correspond to the intersection criterion, to produce this signal the output of the counter 154 is connected to the inputs of the gates 188, 189.

Circuit 161 employs two channels intended for distribution of the closed-open contour characteristics of the second and first subclasses of objects being identified. (cf. Table 1, columns 1 and 5). The first channel includes AND-gates 192, 193, 194, 195, 196, 197, 198, 199, the outputs of which are connected to the classifier 31 and the inputs-to flip-flops 171 to 174.

The second channel of circuit 161 consists of AND-gates 200, 201, 202, 203, 204, 205, 206, 207, 208, 209, 210, 211, 212, 213, OR-gates 214, 215 and flip-flops 216, 217, 218 with an OR-gate 219. The latter are intended for determining whether a check on the closed-open contour characteristics by the K1, K5, K6 commands has taken place or not. The gates 200, 201 are connected to the zero and unity outputs of the flip-flop 175 respectively with the aim of determining, the closed-contour or open-contour characteristics of the contour portions on the arrival of command K6 from the decoder 34 (FIG. 15).

The outputs of the gates 200, 201 (FIG. 17) are connected to the classifier 31. The gate 202 (FIG. 17) is connected to the zero output of the flip-flop 218, which produces a signal indicative of the absence of the closed-open contour characteristic check by command K6, said signal arriving at the same time at the gates 207, 209, 213, 219 and 185. The unity output of the flip-flop 218 is connected to the gates 211, 212 and 184.

Flip-flop 191 is connected by its unity output to the gates 203, 206, 207, 211 and, via the gate 155, to the counter 157, and by its zero output to the gates 204, 208, 209 and 212. Command K1 arrives at the gates 203 and 204, command K6 at the gates 206 and 208, and command K5 at the gates 207 and 209, 211 and 212. The gate 205 is connected with the zero output of the flip-flop 216 and the gate 210 is connected via the gate 219 with the zero outputs of the flip-flops 217 and 218.

The unity inputs of the flip-flops 216 to 218 are connected to the busses 146, 145, 144, respectively.

The outputs of the gates 202 to 205, and 210 to 213 are connected to the classifier 31 directly, and the outputs of the gates 206 to 209 are connected to the classifier via the gates 214 and 215.

Classifier 31 may be executed in any known manner, and the comparison of reference codes with the obtained characteristics codes may be accomplished in accordance with any known classification schemes (full coincidence, Hamming distance, correlation, etc.).

The operation of the automatic system when recognizing numeric character 5 (FIG. 6) is now set forth.

When analyzing objects representations, the automatic system forms synchronizing pulses S1, S2, . . . S28, of the scanning line elements, which determine the moments of delivering the contents of line-code elements to the units of the automatic system, the control pulses V1, V2, V3 delivered in the given sequence for each line prior to the synchronizing pulses S1, S2 . . . S28, control pulses W1, W2, W3, W4, W5 delivered in the given sequence for each line after the synchronizing pulses S1, S2 . . . S28.

In addition, "set to zero" pulses "UO" are formed which effect the reset of appropriate circuits of the system in the initial state at various instants of its operation.

Due to the fact that all the above-mentioned pulses are auxiliary ones, the circuits for forming thereof are not shown in the drawings.

When information arrives from the readout unit 30 at the other circuits of the system, the appropriate value signals correspond to contour and background elements.

In the example being considered these values of the signals are coded, respectively, as "unity" and "zero." In considering the operation principles of the automatic system it is assumed, that the analysis of character representation is performed by vertical lines from top to bottom and from left to right.

Thus, in this example each of the scan frame vertical lines is coded by a 28-digit binary code. For example, the code of the fifth line of character "5" will be 0000011111111000001111111000, and of the 10th line 0011100001110000000000011100.

All the circuits of the automatic system are designed for a modification in which the lines being analyzed are coded by a 28-digit code.

A different length code will alter the number of elements employed in designing separate units of the automatic system without changing the structure of the latter.

Each line code formed in the readout unit 30 (FIG. 11) is fed digit-by-digit and in step with the respective synchronizing pulses S1, S2 . . . S28 by the bus 117 (FIG. 16) to the reception shift register 87 of the logical sum formation unit. From the outputs of the first five flip-flops $88^{I}$, $88^{II}$, $88^{III}$, $88^{IV}$, $88^{V}$ of the reception shift register 87 signals N1, N2, N3, N4, N5, N6, N7, N8 are supplied to those elements of the interval and intersection detecting circuits of the unit 32 (FIG. 15) and in such a combination as is illustrated in FIG. 15.

The number of flip-flops coupled to the unit 32 depends on the selected interval and intersection criteria and, in a general case, may be arbitrary.

In the given examples, two and more successive "unity" digits are considered the criterion of an intersection and two and more successive "zero" digits, the criterion of an interval.

This corresponds to the positions of switches 57 and 60 shown in FIG. 15.

On supplying the fifth line code of character "5" to the reception shift register 87 (FIG. 16) when the sixth and seventh unity digits are in the flip-flops $88^{I}$ and $88^{II}$, from the unity outputs of said flip-flops the signal N2 is supplied to the gate 59 (FIG. 15) directly, and the signal N4 is supplied to said gate via the gate 58.

The output signal of the AND-gate 59 is supplied to the unity input of the flip-flop 61 via switch 60, and an intersection signal is fed to the counter 62 by the flip-flop.

Prior to feeding a line code to the reception shift register 87, the flip-flop 61 is reset into the initial state by a control signal V3, supplied via OR-gate 220.

On the arrival of the subsequent digits of the code being analyzed consisting of successive unities at the register 87 (FIG. 16), the flip-flop 61 (FIG. 15) remains in the fixed state.

On the arrival of the 14th and 15th zero digits at the flip-flops $88^{I}$ and $88^{II}$ of register 87 (FIG. 16), from the zero outputs of said flip-flops, signals N1 and N3 are fed to the inputs of the AND-gates 53, 54, 55 (FIG. 15), in which event the gates 54 and 55 do not operate whereas the gate 53 operates and its output signal, via the switch 57 and gate 220, is supplied to the zero input of the flip-flop 61 setting it to the zero state.

With a further feeding of the code, the flip-flop 61 operates in the manner described above, the counter 62 fixes the number of intersections in the line code (two intersections in the given example). In the beginning of the each line analysis, the counter 62 is set to zero.

The analysis of all the vertical scanning lines of character "5" is performed similarly to the analysis of the fifth line.

The circuit 63, which determines the type of the line according to the number of intersections fixed in the line code and (or) determines the sequence of lines with a definite number of intersections, is connected to the counter 62 and produces type-line signals $n1$–$n8$ after the line has been analyzed (between signals S28 and W1).

The results of the analysis of characters "1" and "5" are given in Table III.

With the preset conditions of determining the line types, for example those given above in the description of the circuit 32, the circuit 63 may be readily realized.

The circuit 33 for obtaining and storing the sequence of line types is set into the initial state by a signal UO in the beginning of the analysis of the recurrent object.

Pulse UO sets the flip-flops 64, 67, 70 into the initial state directly, and the flip-flop 66—via the gate 74, the flip-flop 69—via the gate 75, the flip-flop 72—via the gate 76 and flip-flops 65, 68, 71—via the gate 73.

The state of the circuit varies with the arrival of the line-type signals $n1$–$n8$ and the control pulses V1–V3. Pulses V1–V3 arriving one-by-one prior to the analysis of the first line of the object representation do not change the initial state of the circuit. The line-type signal is fed to the circuit after the analysis of the recurrent line, i.e., after the synchronizing pulse S28.

Signal $n8$ sets flip-flops 64, 65, 66 into the unity state. The unity state of flip-flop 64 is stored up to the beginning of a subsequent object analysis. The unity state of the flip-flop 65 is maintained up to the arrival of the control pulse V3, which appears prior to the beginning of a subsequent line analysis.

Flip-flop 66 is set to the zero state by the control pulse V2, via the gates 82 and 74, if there is present the signal $y$ from the gate 79 indicating that the analyzed line belonged to one of the following types: $n1$, $n2$, $n3$, $n5$.

Flip-flop 67 is set to the unity state by control pulse V1 via the gate 83, if flip-flop 66 is in the unit state and the signal $y$ is present.

Signal $n7$ sets flip-flops 68 and 69 into the unity state.

On the arrival of control pulses V1–V3 and of signal $x$ from the gate 78 indicative of the fact that the analyzed line belonged to one of the following types: $n1$, $n2$, $n3$, $n4$, $n5$, the flip-flops 68, 69 and 70 operate in the way similar to that described for the flip-flops 65, 66 and 67.

Signal $n6$ sets the flip-flop 71 to the unity state. The unity state is stored up to the beginning of the subsequent line analysis.

Flip-flop 72 is set to the unity state by signal $n2$ via the gate 81, if the gate 77 provides a signal indicative of the fact that the flip-flop 69 or 70 is in the unity state. The flip-flop 72 is reset to the zero state on the appearance of the control pulse V1, via the gates 76 and 86, if the flip-flop 68 is in the unity state. After the arrival of the line-type signal, the circuit assumes an appropriate state, which is characterized by the signals $a1$, $a2$, $a3$, $b1$, $b2$, $b3$, $b4$, $c$, $d$, at the unity outputs of flip-flops 64–72, and inverse signals $\overline{a1}$, $\overline{a2}$, $\overline{a3}$, $\overline{b1}$, $\overline{b2}$, $\overline{b3}$, $\overline{b4}$, $\overline{c}$, $\overline{d}$, at the zero outputs of said flip-flops.

The states of flip-flops 64–72 of the circuit 33 for obtaining and storing the line-type sequence after the analysis of each line of characters "1" and "5" (FIG. 2, 6) is shown in Table III.

The states of flip-flops 64–72 (FIG. 15) and their output signals are indicative of the analyzed line types and their sequence. Out of all possible line-type sequences there are detected only those, which are instrumental in forming commands K1–K8 which control other units on the base and of which signals Q1, Q2, Q3, Q4, Q5 are produced for controlling the interaction of the logical sum formation unit registers.

In the preferred embodiment of the present invention the operation of the command decoder 34 for producing commands K1–K8 based on signals from the outputs of flip-flops 64–72 is characterized by the following Boolean functions:

$$K1 = a1 \wedge \overline{a3} \wedge \overline{b4}$$
$$K2 = b1 \wedge \overline{b3} \wedge b4$$
$$K3 = \overline{a1} \wedge a2 \wedge \overline{c} \wedge x \wedge \overline{b4}$$
$$K4 = \overline{a2} \wedge a3 \wedge \overline{c} \wedge z \wedge \overline{b4}$$
$$K5 = a3 \wedge c \wedge \overline{b4}$$
$$K6 = a1 \wedge a2 \wedge a3 \wedge \overline{c} \wedge d \wedge \overline{b4}$$
$$K7 = \overline{b1} \wedge b2 \wedge b4 \wedge \overline{c} \wedge y$$
$$K8 = b3 \wedge b4 \wedge c$$

wherein symbol $\wedge$ indicates logic multiplication (AND operation).

The commands produced by the command decoder 34 after the line analysis of characters "1" and "5∞ (FIGS. 2, 6) are given in Table III.

Commands and control pulses W1, W2, W5 are instrumental in generating control signals Q1, Q2, Q3, Q4, Q5 in the control signal decoder 35 (FIG. 15), which appear at the following moments of time: Q1 and Q2 at the moment of arrival of the control pulse W1; Q3 at the moment of arrival of the control pulse W2; Q4 and Q5 at the moment of arrival of the control pulse W5. The control signals are employed to form logical sums in contour representation sections and to obtain the fixed line codes.

In the preferred embodiment of the present invention, the operation of the control signal decoder 35 is characterized by the following Boolean functions:

$$Q_1 = (K2 \vee K3 \vee K7) \wedge W1$$
$$Q_2 = K7 \wedge W1$$
$$Q_3 = (K2 \vee K3 \vee K4 \vee K5 \vee K6 \vee K7) \wedge W2$$
$$Q_4 = (K1 \vee K2 \vee K6 \vee K8) \wedge W5$$
$$Q_5 = (K2 \vee K5 \vee K6 \vee K8) \wedge W5,$$

wherein symbol $\vee$ indicates the operation of logical summation ("OR" operation).

Control signals produced by the control signal decoder 35 after the line analysis of characters "1" and "5" (FIGS. 2 and 6) are given in Table III.

By means of control commands K1–K8 and control signals Q1–Q5 obtained in the process of contour representation analysis in the unit for forming logical sums (FIG. 16) the representation is divided into sections in which the contour portions are checked for their being closed or open. For each section, the unit forms logical sums of digits of the line codes constituting these sections and, if necessary, stores the codes of the fixed lines relative to which the closed-open contour characteristics of the contour portions are determined.

The unit for forming logical sums and obtaining intersection coordinates is reset in the beginning of the analysis of each character by a reset signal "UO." A complete code of the first character line being analyzed was fed to the reception shift register 87 during one complete cycle defined by synchronizing pulses S1–S28, whereupon the line code is delivered to the flip-flops 90 of the register 89 capable of intermediate storing line codes of the contour representation, by the control pulse W4, which is applied to one of the inputs of gates 95, the remaining inputs of these gates being supplied with signals from the unity outputs of flip-flops 88.

TABLE III

| Line serial number | Line type | Zero state flip-flops | Unity state flip-flops | Commands | Control signals |
|---|---|---|---|---|---|
| 1 | 2 | 3 | 4 | 5 | 6 |
| | | Character "1" (Figure 2) | | | |
| 1 | n1 | 64–72 | ..... | ..... | ..... |
| 2 | n1 | 64–72 | ..... | ..... | ..... |
| 3 | n4 | 64–72 | ..... | ..... | ..... |
| 4 | n3 | 64–72 | ..... | ..... | ..... |
| 5 | n7 | 64–67, 70–72 | 68, 69 | K1 | Q4 |
| 6 | n3 | 64–68, 70–72 | 69 | ..... | ..... |
| 7 | n3 | 64–68, 70–72 | 69 | ..... | ..... |
| 8 | n2 | 64–68, 70–71 | 69, 72 | K3 | Q1, Q3 |
| 9 | n2 | 64–69, 71 | 70, 72 | K4 | Q3 |
| 10 | n2 | 64–69, 71 | 70, 72 | K4 | Q3 |
| 11. | n2 | 64–69, 71 | 70, 72 | K4 | Q3 |
| 12 | n3 | 64–69, 71 | 70, 72 | K4 | Q3 |
| 13 | n7 | 64–67, 71 | 68, 69, 70, 72 | K6 | Q3, Q4, Q5 |
| 14 | n3 | 64–68, 71, 72 | 69, 70 | ..... | ..... |
| 15 | n3 | 64–68, 71, 72 | 69, 70 | ..... | ..... |
| 16 | n3 | 64–68, 71, 72 | 69, 70 | ..... | ..... |
| 17 | n1 | 64–68, 71, 72 | 69, 70 | K3 | Q1, Q3 |
| 18 | n6 | 64–69, 72 | 70, 71 | K5 | Q3, Q5 |
| 19 | n1 | 64–69, 71, 72 | 70 | ..... | ..... |
| 20 | n1 | 64–69, 71, 72 | 70 | ..... | ..... |
| 21 | n1 | 64–69, 71, 72 | 70 | ..... | ..... |
| 22 | n1 | 64–69, 71, 72 | 70 | ..... | ..... |
| | | Character "5" (Figure 6) | | | |
| 1 | n1 | 64–72 | ..... | ..... | ..... |
| 2 | n2 | 64–72 | ..... | ..... | ..... |
| 3 | n3 | 64–72 | ..... | ..... | ..... |
| 4 | n7 | 64–67, 70–72 | 68, 69 | K1 | Q4 |
| 5 | n3 | 64–68, 70–72 | 69 | ..... | ..... |
| 6 | n3 | 64–68, 70–72 | 69 | ..... | ..... |
| 7 | n4 | 64–68, 70, 71, 72 | 69 | K3 | Q1, Q3 |
| 8 | n8 | 67–69, 71, 72 | 64–66, 70 | K2 | Q1, Q3 |
| 9 | n4 | 65, 67–69, 71, 72 | 64, 66, 70 | ..... | ..... |
| 10 | n4 | 65, 67–69, 71, 72 | 64, 66, 70 | ..... | ..... |
| 11 | n2 | 65, 67, 68, 69, 71, 72 | 64, 66, 70 | K7 | Q1, Q2, Q3 |
| 12 | n4 | 65, 66, 68, 69, 71 | 64, 67, 70, 72 | ..... | ..... |
| 13 | n8 | 68, 69, 71 | 64–67, 70, 72 | ..... | ..... |
| 14 | n4 | 65, 68, 69, 71 | 64, 66, 67, 70, 72 | ..... | ..... |
| 15 | n4 | 65, 68, 69, 71 | 64, 66, 67, 70, 72 | ..... | ..... |
| 16 | n3 | 65, 68, 69, 61 | 64, 66, 67, 70, 72 | K7 | Q1, Q2, Q3 |
| 17 | ny | 65, 66, 71 | 64, 67–70, 72 | ..... | ..... |
| 18 | n3 | 65, 66, 68, 71, 72 | 64, 67, 69, 70 | ..... | ..... |
| 19 | n2 | 65, 66, 68, 71, 72 | 64, 67, 69, 70 | ..... | ..... |
| 20 | n1 | 65, 66, 68, 69, 71 | 64, 67, 70, 72 | ..... | ..... |
| 21 | n6 | 65, 66, 68, 69 | 64, 67, 70–72 | K8 | Q4, Q5 |
| 22 | n1 | 65, 66, 68, 69, 71 | 64, 67, 70, 72 | ..... | ..... |

Preliminarily, the contents of intermediate storage register 89 are delivered to the flip-flops 92 of the logical sum formation shift register 91 by means of a control pulse W2 applied to the inputs of gates 96, the other inputs of which are connected to the unity outputs of the flip-flops 90 of the intermediate storage register 89, whereupon the flip-flops 90 are reset by the control pulse W3 arriving at the register 89, via the gate 98.

In the process of feeding the line codes one-by-one from register 87 to register 89 and delivering the codes to register 91, the latter registers the logical sum of the arriving line codes.

The above-mentioned interaction of register 87, 89, 91 proceeds until the control signals Q1–Q5 arrive at the unit for forming logical sums. This interaction will hereinafter be referred to as "typical."

On the arrival of a control signal Q3 from the decoder 35 (FIG. 15) to the inputs of gates 97 (FIG. 16) whose other inputs are connected to register 89, the line code stored in this register is delivered to flip-flops 94 of the fixed line code storage shift register 93. Preliminarily, flip-flops 94 of the register 93 are reset by control signal Q1, via the gate 100.

On appearance of the control signal Q4 at the input of the gate 101 and of control signal Q5 at the input of the gate 102, during the action of the synchronizing pulses S1–S28, the transfer of codes being stored in registers 91 and 93 to the section code distribution circuit 37 (FIG. 17) is performed.

Control signals Q4 and Q5, which appear simultaneously with control pulse W5 and are applied to the gates 101, 102 are preserved during the introduction of a recurrent line code and are taken off these gates by the control pulse W1 of the next line with the aid of circuits not shown in the drawing, after the action of the synchronizing pulse S28 ceases.

Information from the last five flip-flops 94 of the register 93 is also applied to the circuit 103, which, in case at least one of the commands K2, K5, K6 is present at the gate 107, starts fixing the intersection coordinates of the code being transferred from register 93. Commands K2, K5, K6 are preserved at the input of the gate 107 during introduction of a recurrent line code and are taken off by means of circuits not shown in the drawings, after the introduction of this code is over.

The circuit 103 operates in the way similar to that of unit 32 (FIG. 15) with the difference in that it fixes the number of intervals in the fixed line code between intersections and does not determine the types of the lines.

The description of the operation of the unit for forming logic sums when analyzing character "5" (FIG. 6) is now set forth.

As may be seen from Table III, when introducing codes of the first three lines, a typical interaction of registers 87, 89, 91 (FIG. 16) takes place. At the end of the fourth line the command K1 is generated on the arrival of a line-type signal and the control signal Q4 is generated on the arrival of the control pulse W5. Thus, register 91 stores the logical sum of line codes of the first section of the character including 1 to 3 lines. During the introduction of the fifth line code into the reception register 87 by control signal Q4, a sequential transfer of the first section logical sum code, via buses 147, 150, to the contour representation section code distribution circuit 37 (FIG. 17) takes place. Thereon, before the introduction of the seventh line code into the reception register 87 is over, a typical interaction of registers 87, 89, 91 takes place. After the introduction of the seventh line code and at the appearance of the line-type signal command K3 is generated, at the appearance of control pulse W1—signal Q1, at the appearance of pulse W2—signal Q3. The signal Q1 resets the flip-flops 94 of register 93 via the gate 100, and the sixth line code is introduced, via the gate 97, into the shift register 93 by signal Q3. At the end of the eighth line code introduction into register 87, a command K2 is generated, at the appearance of pulses W1, W2, signals Q1, Q3, are generated respectively and at the appearance of pulse W5 signals Q4 and Q5 are generated. Command K2 is preserved at the input of the gate 107 during the introduction of the recurrent line code. Signal Q1 resets register 93, signal Q3 effects the transfer of the seventh fixed line code from register 89 to register 93, via gates 91, signals Q4, Q5 prepare registers 91, 93 for the transfer of the logical sum code from register 91 and of the fixed line code from register 93. When introducing the ninth line code, the logical sum code and the fixed line code are taken off registers 91, 93, via buses 147, 150 and 148, 149, respectively.

The fixed line code 0011100000111000000000011100 is delivered from register 93 to circuit 103 digit-by-digit beginning from the first digit, in step with the synchronizing pulses S1–S28. On the arrival of the third and fourth digits of the fixed line codes at the two finite flip-flops $94'$, $94''$ of register 93, signals from the unity outputs of these flip-flops are fed, via gates 104, 105, 106 and switch 108, to the unit input of flip-flop 115, the interval counter 116 fixes the first intersection in the fixed line code, and a signal P1 representative of the first interval will appear at the output thereof. At the appearance of the sixth and seventh digits of the code at the two finite flip-flops $94'$, $94''$ of register 93, the zero output signals of these flip-flops will arrive, via the gate 111, the switch 114 and the gate 113, at the zero input of the flip-flop 115, thereby turning it over to the zero state. When the 11th and 12th digits of the codes appear at the two finite flip-flops $94'$, $94''$ of register 93, the counter 116 will again fix an intersection, signal P1 representative of the first interval will disappear from its output and signal P2 of the second interval will appear.

The third intersection is fixed in a similar way, and signal P2 of the second interval disappears from the output of the counter 116. The flip-flop 115 is reset to the zero state by control pulse V3, arriving via gate 113. The same pulse V3 resets counter 116. The codes obtained in registers 91 and 93 are transferred to counters 152, 154 and 157 (FIG. 17) via the circuits 37 for distributing section codes of contour representation. The code from the register 91 is fed to the counter 152, via elements 131 and 134, only on the arrival of commands K2 or K8 at the input of gate 133. A code from the register 93 passes by bus 148 to said counter 153, via gate 134, only upon the arrival of command K6 at the input of gate 132.

Counters 154 and 157 receive the code from register 93, via gates 139, 140, upon the arrival of command K5 at the inputs of gates 135, 136, and from the register 91, via the same gates 139, 140, upon the arrival of commands K6 or K1 at the inputs of gates 137 and 138, via gate 141.

As seen from the analysis of character "5" (Table III), the logical sum code of the first section is delivered from the register 91 to counters 154, 157 by command K1, the logical sum code of the second section is delivered from the register 91 to the counter 152 by command K2 and the logical sum code of the third section is delivered to the counter 152 by command K8.

Counter 152 estimates zero digits in the logical sum code. The results are delivered to gates 166–170 of the circuit 160 for analyzing the contour for its being open, via switches 165. Counter 152 is reset by a signal applied from the intersection coordinate fixing circuit 103 (FIG. 16) to an OR-gate 225 via a bus 224 (FIG. 17) or by control pulse V3 applied to the same gate 225.

Counters 154 and 157 estimate, respectively, unity and zero digits of the logical sum code. The results are delivered to the circuit 160 for analyzing the contour for its being open. Counter 154 is reset by control pulse V3 or by a signal from the output of gate 186, which are fed to an OR-gate 226. Counter 157 is reset by the output signal of counter 154.

The first channel of circuit 160 analyzes contour portions in appropriate places for being open on the appearance of commands K2 or K8, signals P1 or P2 and signals from the output of counter 152. A signal appears at the output of gate 166 if a contour portion belonging to the second subclass of objects if found to be open during the first check (Table 1); a signal appears at the output of gate 167, if a contour portion is found to be open during the second check; a signal appears at the output of gate 168 during the third check, and at the output of gate 169 during the fourth check.

The output signals from gates 166–169 set flip-flops 171–174 to the unity state. Flip-flops 171–174 are set to the zero state by a signal applied from the gate 225 through a bus 227. A signal corresponding to the open-contour characteristic E2 from the output of the gate 192, and a signal, corresponding to the closed-contour characteristic E1 from the output of the gate 193 are fed to the classifier 31, when a signal indicating that the analysis of the object of the second subclass is over appears at the other inputs of the gates 192 and 193 via a bus 228. Signals corresponding to the closed-contour characteristics F1, G1, H1 and to the open-contour characteristics F2, G2, H2 are produced at the outputs of the gates 194–199 during the subsequent checks in much the same way.

For example, when analyzing the second section of character "5," during the first check (Table 1), a signal indicating that the contour is closed between the first and second intersections in this section appears at the output of gate 193, and, during the second check, a signal appears at the output of gate 194, since the contour between the second and the third intersections is open. When analyzing the third section, during the third check, a signal will appear at the output of gate 196, since the contour between the first and the second intersections is open. During the fourth check of the same section, a signal will appear at the output of gate 199, since the contour between the second and third intersections is closed.

Contour portions of the first subclass (Table 1) are analyzed for being open in the second channel of the circuit 160.

A signal appears at the output of gate 182 upon the detection of an open contour during the first check (Table 1) when command K1 arrives through bus 146; a signal appears at the output of gate 185 upon the detection of an open contour during the second check in accordance with paragraph "*a*" upon the arrival of command K5 through bus 145, and a signal will arrive at the output of gate 183 during the third check in accordance with paragraph "*c*" upon the arrival of command K6 through bus 144. At the output of gate 184 a signal will arrive on the detection of an open contour during the last check upon the arrival of command K5 through bus 145. Gate 170, which produces an output signal upon the detection of an open contour during the third check, should be regarded as belonging to the second channel, through constructionally this gate is associated with the gates of the first channel. The output signals of gates 182–185 set the flip-flop 187 to the unity state via the gate 186, and set the unity digit counter 154 to the zero state. Flip-flop 187 is reset by a control pulse V3.

Gates 188, 189, 190 control the operation of flip-flop 191. At the beginning of each line, flip-flop 191 is reset by control pulse V3. A signal from the output of counter 154, corresponding to a definite number of unity digits in the logical sum code, sets the flip-flop to the unity state, via gate 188.

A signal from the unity output of flip-flop 191 is fed to circuit 161 and gate 155 which permits the passage of section codes to counter 157. As a result of counter 157 operation, flip-flop 187 fixes the number of zero digits corresponding to the open-contour criterion, and, if at the output of counter 154 the signal corresponding to a definite number of unity digits in the logical sum code appears again, flip-flop 191 is reset to the zero state, via gates 189 and 190.

If flip-flop 187 does not produce a signal corresponding to the open-contour criterion, or if at the output of counter 154 a signal does not arrive for the second time, flip-flop 191 remains in the unity state, which corresponds to a closed contour during one of the checks. The output signal of the zero state of flip-flop 191, corresponding to an open contour during one of the checks, is passed to the gates 204, 208, 209 and 212 of circuit 161, the output signal of the unity state of flip-flop 191 is passed to the gates 203, 206, 207, 211 of the same circuit.

The second channel of circuit 161, besides signals coming from flip-flop 191, via buses 144, 145, 146, receives commands K6, K5, K1. A certain combination of these commands and signals from flip-flop 191 causes the appearance at the output of gates 203, 204, 206–209, 211 and 212 of signals, corresponding to characteristics A1, A2, B1, B2, D1, D2.

The output signal of gate 203 corresponds to the closed-contour characteristic A1 fixed in the course of the first check, and the output signal of gate 204 corresponds to the open-contour characteristic A2 fixed during the first check. The output signals of gates 207 and 206 correspond to the closed-contour characteristic B1 fixed during the second check, in accordance with paragraphs "*a*" and "*c*," respectively, and the output signals of gates 209 and 208 correspond to the open-contour characteristic B2 fixed in the course of the second check, in accordance with paragraphs "*a*" and "*c*," respectively. The output signal of gate 211 is produced upon fixing the closed-contour characteristic D1, and the output signal of gate 212 is produced upon fixing the open-contour characteristic D2 during the last check.

The output signals of gates 205, 210, 202, 213 corresponding to "absence of check" characteristics A3, B3, C3, D3 are produced by a signal from a bus 229 indicative of the fact that the analysis of the first subclass of objects is over, in case commands K1, K5, K6 were not detected respectively by flip-flops 216, 217, 218 during this object analysis.

Flip-flops 216 to 218 are reset by pulse "UO" at the beginning of the object analysis. If the second and third checks are performed simultaneously, which is necessary for some versions of the object representation, the third check is performed in the first channel of circuit 160, and the second check is performed in the second channel of said circuit. During the third check, counter 152 estimates the number of zero digits in the logical sum code by command K6, and if the first interval signal P1 is present in the fixed line code, flip-flop 175 is set to the unity state by gate 170. In this case, in order to determine the closed-contour characteristic C1 in the course of the third check a signal is fed from the zero output of flip-flop 175 to gate 200, and for determining the open-contour characteristic C2 is fed from the unity output of flip-flop 175 to gate 201. At the same time the second check is performed in the second channel of circuit 160 by command K6 in the manner described above.

The possibility of a simultaneous operation of the both channels of circuit 160 allows a considerable reduction of equipment utilized in the automatic system.

For example, in analyzing the logical sum code of the first section of the character "5" contour, a signal, corresponding to the open-contour characteristic A2, detected upon the first check, will appear at the output of circuit 161 from gate 204. Thus, the following closed-open contour characteristic sequence of the contour portions can be made up for character "5": A2E1G2F2H1. In a similar way the code sequence of characteristics for character "1": A2B1C1D2 can be made up.

The obtained closed-open contour characteristics of the contour portions are compared in classifier 31 with reference characteristics stored in the latter. On the basis of this comparison a decision is made as to which of the reference classes the object being identified belongs.

The reference characteristics may be preliminarily introduced into classifier 31 and, otherwise, may be worked out in the process of learning (self-learning) of the automatic system.

The present method of and automatic system for recognizing objects by their contour representation enables recognition of objects featuring considerable nonlinear variations in configuration. The object being recognized may be in the form of handwritten alphanumerical characters, various typewritten and printed types, complex configuration curves, etc.

This method may be used as the basis for developing an apparatus capable of reading data directly from primary documents followed by rapid introduction thereof into electronic computers. There can be developed independent automatic systems based on the present machine, capable of transferring data from primary documents to technical information carriers (punched cards, tapes, magnetic tapes and so on), which makes it possible to relieve a great number of operators who work at keyboard apparatus of manual coding.

The present embodiment of the automatic machine allows pattern recognition to be carried out in real time (characteristic detection and decision making are completed simultaneously with the end of line-by-line scanning of patterns, which is particularly important when high-speed of the system and pattern analysis in real time are essential).

The present set of closed-open contour characteristics of contour portions provides for developing a system capable of recognizing unknown objects by very common a priori data (learning and self-learning apparatus).

In the set of principal closed-open contour characteristics a number of intermediate characteristics can be readily introduced, they may be used to advantage when classifying patterns in order to increase recognition reliability.

The automatic system of the present invention can be rather easily realized and affords quick-action and reliability of recognition.

The herein described method may be in the form of a program and be entered into the electronic computer for recognizing objects being stored in the memory.

What is claimed is:

1. A method of recognizing objects by their contour representations in a background, said contour representations being similar to the contour of a reference object comprising: dividing the contour representation into scanning lines, coding said scanning lines into line codes whose digits represent by their value elements of the contour and background, determining numbers of intersections of the scanning lines with the contour of the object being analyzed, an intersection being defined as the detection of a preset line code digit sequence indicative of the intersection determining transitions from lines with one number of intersections to lines with another number of intersections, fixing lines into dividing lines at the places of transitions from lines with one number of intersections to lines with another number of intersections, dividing the contour represented by said dividing lines into sections, forming section codes for said sections from preset digits of respective line codes, detecting in the section codes code portions confined between the code digits formed with using the line code digits indicative of the intersections in at least one of the dividing lines defining the boundaries of the sections, determining closed-open contour characteristics of the contour portions between intersections in the dividing lines by the contents of said code portions, determining by the obtained closed-open contour characteristics of the contour portions whether the object being recognized belongs to the reference object.

2. A method as claimed in claim 1, including the step of dividing the contour of the object by dividing lines into sections during automatic detection of said dividing lines in places of transition from scanning lines with one number of intersections to scanning lines with another number of intersections.

3. A method as claimed in claim 2, including the step of presetting the closed-open contour characteristics of a plurality of reference objects to make the object being analyzed recognizable by comparing the obtained closed-open contour characteristics with those of the plurality of reference objects.

4. A method as claimed in claim 3, including the steps of storing the obtained closed-open contour characteristics wherein the stored characteristics are the subsequent reference closed-open contour characteristics.

5. A method as claimed in claim 1, including the step of storing the obtained closed-open contour characteristics to form a process of learning, wherein the stored characteristics are the reference closed-open contour characteristics.

6. A method as claimed in claim 1, including the step of integrating the contents of the line code preset digits to form the section codes.

7. A method as claimed in claim 6, including the step of converting digit-by-digit the results of integrating the contents of the line code digits into the binary code.

8. A method as claimed in claIm 1, wherein the line code digits are binary, including the step of forming the code digits of sections by logical summation of the contents of the preset line code digits in respective sections, forming the closed-open contour characteristics of contour portions characterized by code portions by sensing the number of zero digits in the code portions of the logical sum and comparing said number with the threshold number of zero digits said open contour portion being indicated as present when said number is greater than said threshold number.

9. A method as claimed in claim 1, including the steps of line-by-line analyzing the contour representation in several directions to determine closed-open contour characteristics of the contour portions.

10. A method as claimed in claim 1, comprising detecting the number of obtained closed-open contour characteristics of the contour portions of the object being analyzed and comparing said number with that of the said reference objects.

11. An automatic system for recognizing objects by their contour representations, comprising in combination:

a scanning means for dividing said contour representations into scanning lines to produce line codes consisting in signal sequences representing contour and background elements confined in said scanning lines;

a means for determining numbers of intersections of said scanning lines with said contour to produce line-type signals according to numbers of said intersections obtained by taking into account an intersection when detecting a signal sequence preset as indicative of the intersection connected to said scanning means;

a means for detecting line-type sequences to produce signals representing transitions from scanning lines with one number of intersections to scanning liens with another number of intersections connected to said means for determining numbers of intersections;

a command decoder connected to said means for detecting line-type sequence to produce commands in accordance with line-type sequence detected;

a decoder of control signals connected to said command decoder to produce control signals in accordance with commands produced by said command decoder;

a means for forming section codes of contour representation connected to said scanning means and said decoder of control signals to form section codes from the said codes of the lines confined between dividing lines in response to said control signals, said dividing lines being scanning lines fixed at places of transition from scanning lines with one number of intersection to scanning lines with another number of intersections and their detection being represented by commands of said command decoder, said means for forming section codes including a means for obtaining intersection coordinates in dividing lines connected to said command decoder and operating in response to commands of said command decoder representing detection of said dividing lines;

a means for recalling line and section codes connected to said command decoder and said means for forming section codes to cause the output of said section codes and of codes of said dividing lines from the said means for forming section codes in response to commands of said command decoder;

a means for obtaining closed-open contour characteristics of contour portions connected to said means for recalling line and section codes, said means for obtaining intersection coordinates and said command decoder to detect in said section codes code portions confined between section code digits formed with using dividing line code digits indicative of the intersections and forming said intersections coordinates in the division lines and to determine closed-open contour characteristics of contour portions by contents of said code portions of section codes, said detection of the code portions being performed in response to commands of said command decoder and to output signals of said means for obtaining intersection coordinates in dividing lines;

a classifier connected to said means for obtaining closed-open contour characteristics of contour portions to define on the base of obtained closed-open contour characteristics of contour portions the belonging of the object being recognized to one of reference objects.

12. An automatic system as claimed in claim 11, wherein said means for detecting line-type sequence comprises storage means including flip-flop circuits; AND gates; OR gates connected with each other and with said AND gates so that, in accordance with the sequence of the line-type signals, commands formed in said command decoder controlling said means for forming the section codes of contour representation and intersection coordinates, said means for recalling line and section codes and said means for obtaining the closed-open contour characteristics of contour portions.

13. An automatic system as claimed in claim 11, wherein for the repetitive analysis of the contour in case the reference and obtained closed-open contour characteristics do not coincide adequately, there is provided a feedback coupling from the output of said classifier to said means for determining numbers of intersections said feedback coupling changing the criterion of detecting intersections and intervals in the line codes.

14. An automatic system as claimed in claim 31, wherein, for preliminary classification of the objects being recognized into subclasses determined by the presence of lines with a preset number of intersections, said command decoder is connected to said classifier.

15. An automatic system as claimed in claim 11, wherein said means for forming section codes of contour representation is a unit for forming logical sums of the contents of preset digits of said codes of the lines confined between said dividing lines and including said means for obtaining intersection coordinates in dividing lines.

16. An automatic system as claimed in claim 15, wherein said unit for forming logical sum comprises a reception shift register; means for controlling the elements of the logical sum forming unit including AND and OR gates; at least one register for intermediate storage of the line codes of contour representation connected with said reception shift register via said AND and OR gates; at least one shift register for obtaining the dividing line codes, connected to said register for intermediate storage of the line codes of contour representation via AND and OR gates; at least one shift register for forming logical sums connected to said registers for intermediate storage of the line codes, via AND and OR gates, and connected to said means for recalling line and section codes; said means for obtaining intersection coordinates connected to said shift register for obtaining the dividing line codes.

17. An automatic system as claimed in claim 16, wherein said means for obtaining closed-open characteristics of contour portions comprises at least one open-contour criterion counter connected to said means for obtaining intersection coordinates and to said means for recalling line and section codes; a means for analyzing contour portions for their being open including AND, OR gates and flip-flop circuits for fixing the open-contour characteristics and connected to said open-contour criterion counter; a means for distributing the closed-open contour characteristics of the contour portions including AND and OR gates and flip-flop circuits and connected to said means for analyzing the contour portions for their being open.

18. An automatic system as claimed in claim 17, wherein said means for obtaining closed-open characteristics of contour portions comprises in addition at least one pair of counters for estimating the number of unity and zero digits in the section codes being checked for the presence of the closed-open contour characteristic as determined with respect to the dividing line with two intersections; said counters having inputs and outputs; said counter inputs connected to said means for recalling line and section codes; said outputs of the zero digit counter connected to said means for analyzing the contour portions for their being open; said outputs of the unity digit counter connected to said means for analyzing the contour portions for their being open and to the reset input of said zero digit counter.

19. An automatic system as claimed in claim 18, which includes switches which set the open-contour criteria connected between said zero digit counters and said means for analyzing the contour portions for their being open.

20. An automatic system as claimed in claim 17, which comprises a switch means inserted between said open-contour criterion counter and said means for analyzing the contour portions for their being open to set the open-contour criterion of the contour portions.

21. An automatic system as claimed in claim 17 in which there is provided a feedback coupling from the output of said classifier to said means for analyzing contour portions for their being open, said feedback coupling changing the criterion of detecting the open-contour characteristics of the contour portions.

22. An automatic system as claimed in claim 11, wherein said means for determining numbers of intersection comprises a means for detecting intersections according to the number of unity digits in the said codes of the lines which includes AND and OR gates; a means for detecting intervals between intersections in accordance with the number of zero digits between unity digits in said codes of the lines which includes AND and OR gates; a flip-flop circuit whose inputs are connected to said means for detecting intersections and to said means for detecting intervals; a counter connected to said flip-flop circuit; a means for determining the type of lines in accordance with the number of intersections in the lines being analyzed and their sequence connected to said counter.

23. An automatic system as claimed in claim 22, wherein at the output of said means for determining numbers of intersections, there are provided means for measuring time intervals between intersections, said time intervals being the characteristics of the object being recognized, the outputs of said means being connected to said classifier provided with respective reference time interval characteristics.

24. An automatic system as claimed in claim 11, in which, to increase the number of characteristics of the object being recognized, said means for determining the line types is connected with said classifier which receives respective reference line-type characteristics.

25. An automatic system as claimed in claim 11, wherein at the output of said command decoder there are provided means for measuring time intervals between control commands, said time intervals being the characteristics of the object being recognized, the outputs of said means being connected to said classifier provided with the appropriate reference time interval characteristics.

* * * * *